United States Patent
Paladugu

(10) Patent No.: US 9,288,816 B2
(45) Date of Patent: Mar. 15, 2016

(54) PROVIDING SERVICE BASED ON QUALITY OF SERVICE RESOURCES IN A LONG TERM EVOLUTION COMMUNICATIONS SYSTEM

(71) Applicant: QUALCOMM Incorporated, San Diego, CA (US)

(72) Inventor: Karthika Paladugu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 72 days.

(21) Appl. No.: 14/012,974

(22) Filed: Aug. 28, 2013

(65) Prior Publication Data

US 2014/0066084 A1 Mar. 6, 2014

Related U.S. Application Data

(60) Provisional application No. 61/695,717, filed on Aug. 31, 2012.

(51) Int. Cl.
| | |
|---|---|
| *H04W 72/00* | (2009.01) |
| *H04W 72/08* | (2009.01) |
| *H04W 28/24* | (2009.01) |
| *H04W 76/02* | (2009.01) |

(52) U.S. Cl.
CPC ............ *H04W 72/087* (2013.01); *H04W 28/24* (2013.01); *H04W 76/022* (2013.01); *H04W 76/027* (2013.01)

(58) Field of Classification Search
CPC . H04W 72/087; H04W 28/24; H04W 76/022; H04W 76/027
USPC ............................ 455/452.2, 452.1, 450, 453
See application file for complete search history.

(56) References Cited

U.S. PATENT DOCUMENTS

| | | | |
|---|---|---|---|
| 7,031,718 | B2 | 4/2006 | Jouppi et al. |
| 8,204,505 | B2 | 6/2012 | Jin et al. |

(Continued)

FOREIGN PATENT DOCUMENTS

| | | |
|---|---|---|
| WO | 0141376 A2 | 6/2001 |
| WO | 2010033872 A2 | 3/2010 |

OTHER PUBLICATIONS

3GPP: "3rd Generation Partnership Project; Technical Specification Group Services and System Aspects; General Packet Radio Service (GPRS); Service description; Stage 2 (Release 11)" 3GPP Draft; 23060-B20 CRS Implemented, 3rd Generation Partnership Project (3GPP), Mobile Competence Centre. 650, Route Des Lucioles. F-06921 Sophia- Anti Polis Cedex. France, Jun. 22, 2012, XP050625372, [retrieved on Jun. 22, 2012], pp. 201,202, paragraph 9.2.1A; figures 63, 64, pp. 210-213, pp. 217, 220, 221-226.

(Continued)

*Primary Examiner* — Khai M Nguyen
(74) *Attorney, Agent, or Firm* — Muncy, Geissler, Olds & Lowe, P.C.

(57) ABSTRACT

In an embodiment, an apparatus (e.g., a client device or a server) sends, to a Long Term Evolution (LTE) network component, a request to setup a Quality of Service (QoS) bearer with a threshold level of QoS to support the communication session for the client device. The apparatus permits the client device to proceed with the attempt to setup the communication session irrespective of whether the LTE network component grants the threshold level of QoS for the QoS bearer. In another embodiment, the LTE network component rejects an initial QoS request from the apparatus due to QoS unavailability, and then receives another QoS request within a threshold period of time. Based on the two (or more) QoS requests being received within the threshold period of time, the LTE network component allocates an available level of QoS to the client device that is less than the requested level of QoS.

11 Claims, 21 Drawing Sheets

(56) References Cited

U.S. PATENT DOCUMENTS

| | | |
|---|---|---|
| 8,325,658 B2 | 12/2012 | Rosen et al. |
| 2002/0093925 A1 | 7/2002 | Chuah |
| 2006/0034213 A1 | 2/2006 | Munje et al. |
| 2010/0074109 A1 | 3/2010 | Klingenbrunn et al. |
| 2011/0021202 A1* | 1/2011 | Rosen ................ H04W 72/087 455/450 |
| 2011/0211439 A1* | 9/2011 | Manpuria et al. ............ 370/216 |
| 2011/0222399 A1 | 9/2011 | Shi et al. |
| 2014/0140213 A1* | 5/2014 | Raleigh ............... H04L 67/2804 370/235 |
| 2015/0208456 A1* | 7/2015 | Guo et al. ................. 455/426.1 |

OTHER PUBLICATIONS

International Search Report and Written Opinion—PCT/US2013/057409—ISA/EPO—Mar. 5, 2014.

* cited by examiner

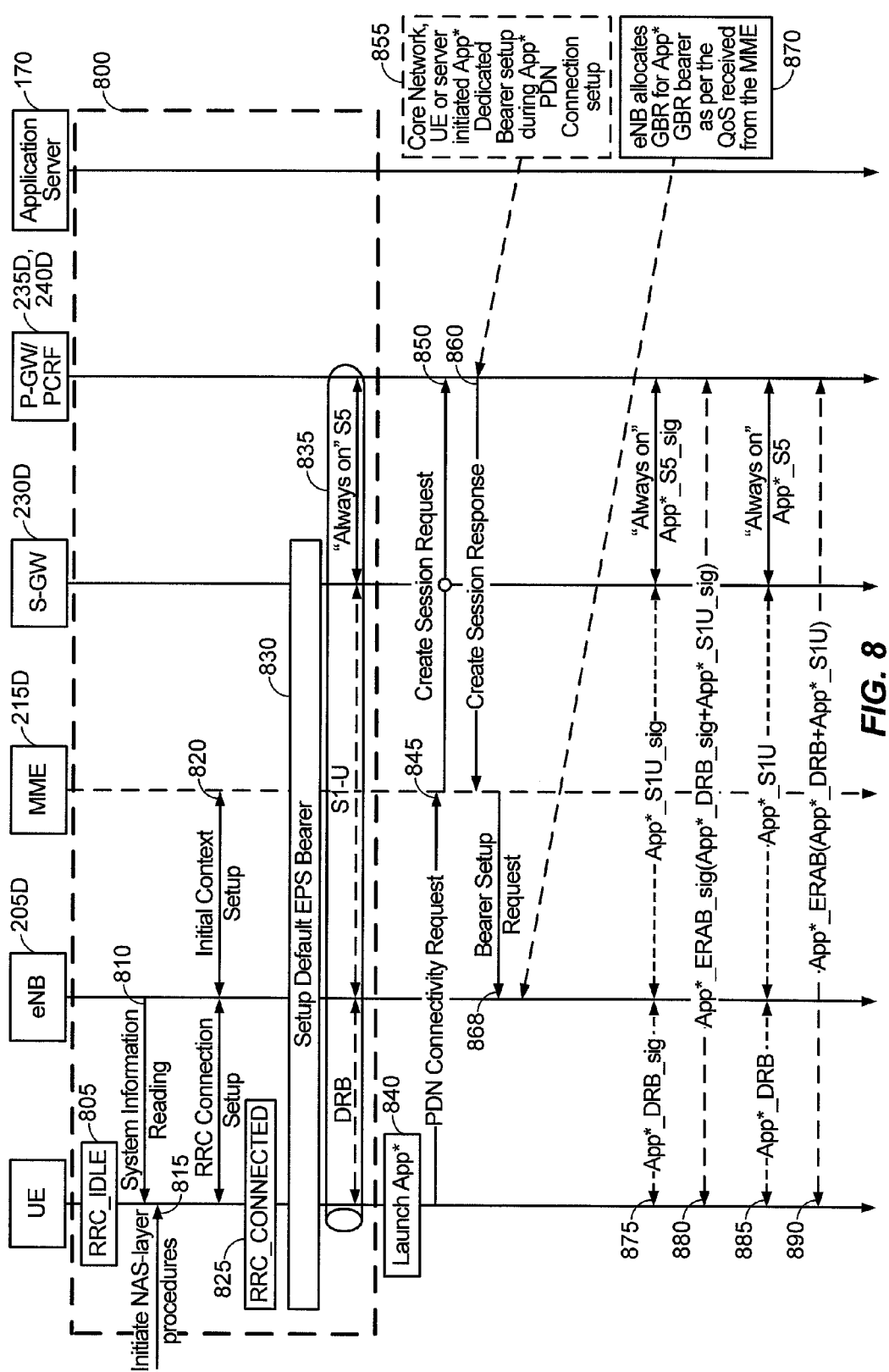

PROVIDING SERVICE BASED ON QUALITY OF SERVICE RESOURCES IN A LONG TERM EVOLUTION COMMUNICATIONS SYSTEM

CLAIM OF PRIORITY UNDER 35 U.S.C. §119

The present Application for Patent claims priority to Provisional Application No. 61/695,717, entitled "PROVIDING SERVICE BASED ON QUALITY OF SERVICE RESOURCES IN A LONG TERM EVOLUTION COMMUNICATIONS SYSTEM", filed Aug. 31, 2012, by the same inventors as the subject application, assigned to the assignee hereof and hereby expressly incorporated by reference herein in its entirety.

BACKGROUND OF THE INVENTION

1. Field of the Invention

Embodiments of the invention relate to providing service based on Quality of Service (QoS) in a Long Term Evolution (LTE) communications system.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

In an embodiment, an apparatus (e.g., a client device or a server) sends, to a Long Term Evolution (LTE) network component, a request to setup a Quality of Service (QoS) bearer with a threshold level of QoS to support the communication session for the client device. The apparatus permits the client device to proceed with the attempt to setup the communication session irrespective of whether the LTE network component grants the threshold level of QoS for the QoS bearer. In another embodiment, the LTE network component rejects an initial QoS request from the apparatus due to QoS unavailability, and then receives another QoS request within a threshold period of time. Based on the two (or more) QoS requests being received within the threshold period of time, the LTE network component allocates an available level of QoS to the client device that is less than the requested level of QoS.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 8 illustrates an 'Always On' Quality of Service (QoS) setup procedure for a particular Guaranteed Bit Rate (GBR) EPS bearer.

DETAILED DESCRIPTION

Figure 1:
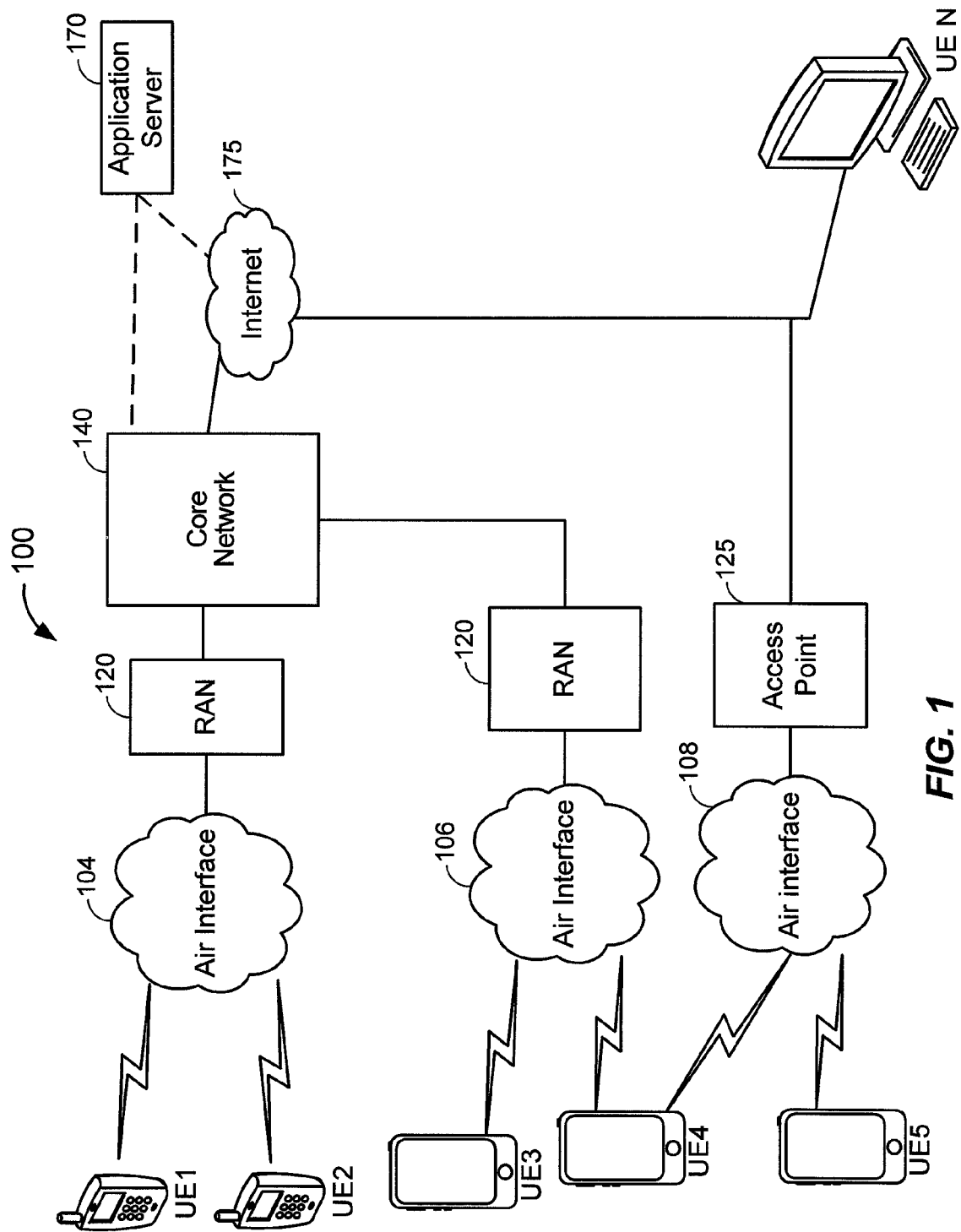
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touchscreen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
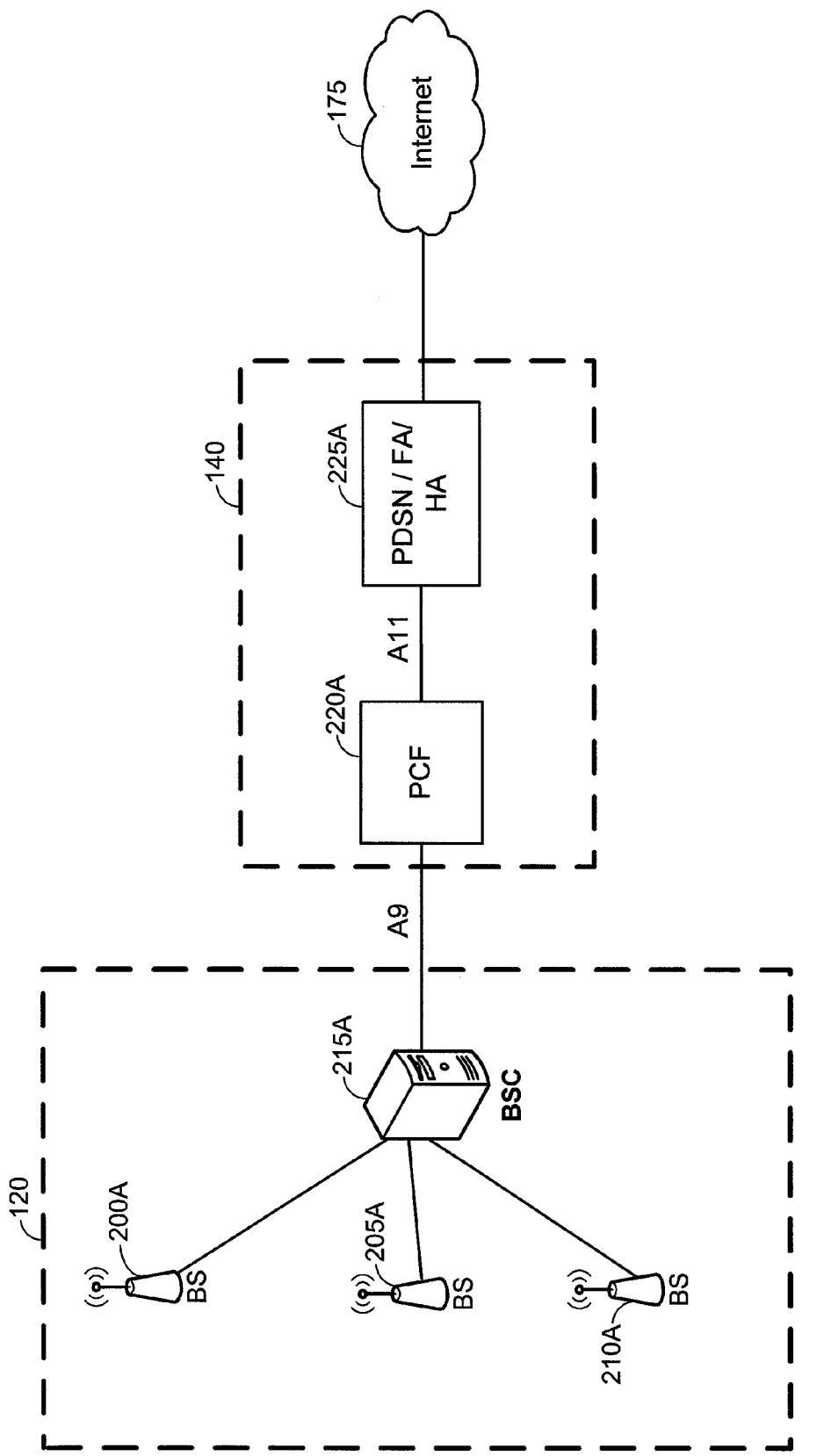
FIG. 2A illustrates an example configuration of a radio access network (RAN) and a packet-switched portion of a core network for a 1×EV-DO network in accordance with an embodiment of the invention.

FIG. 2A illustrates an example configuration of the RAN 120 and the core network 140 for packet-switched communications in a CDMA2000 1x Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
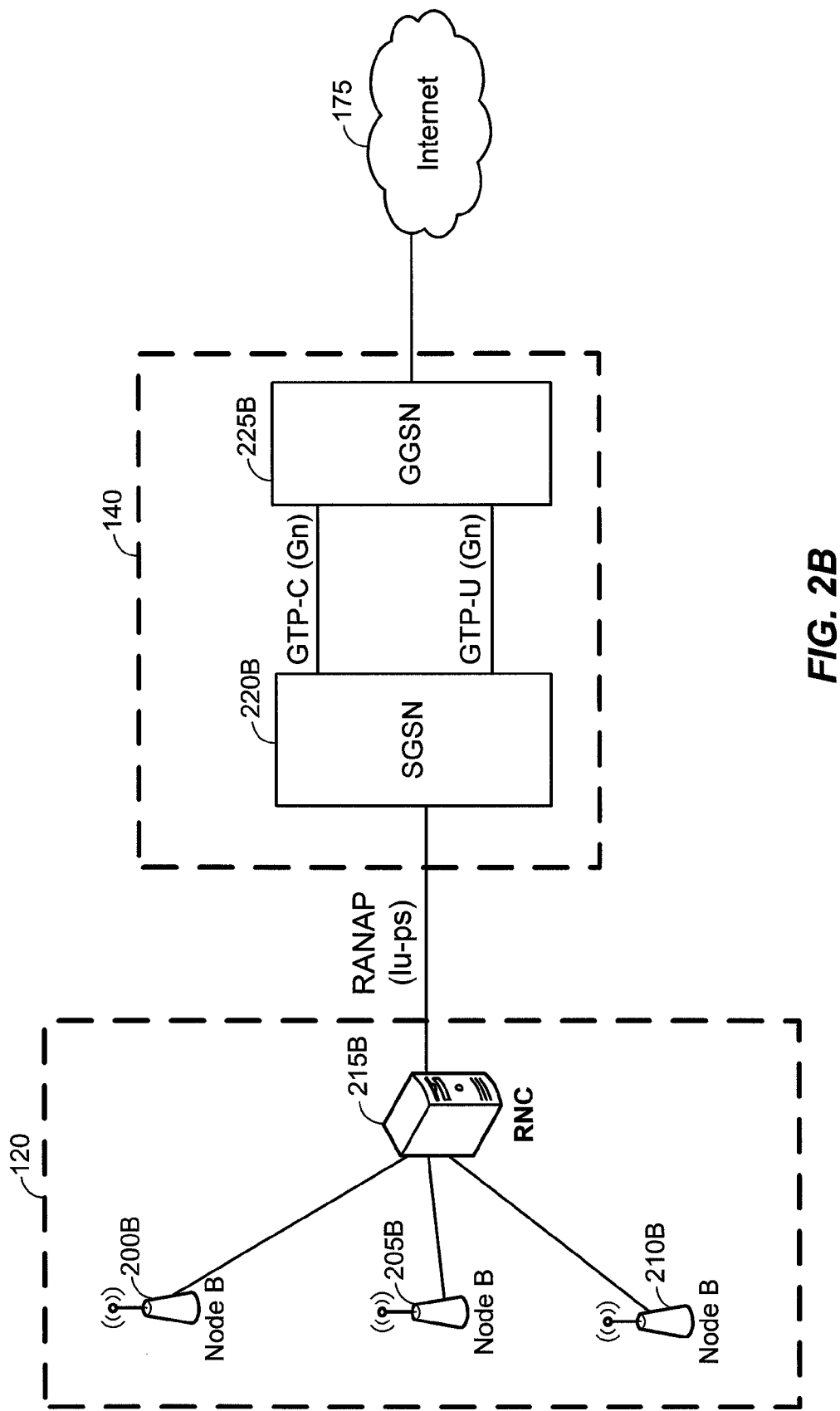
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1xEV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
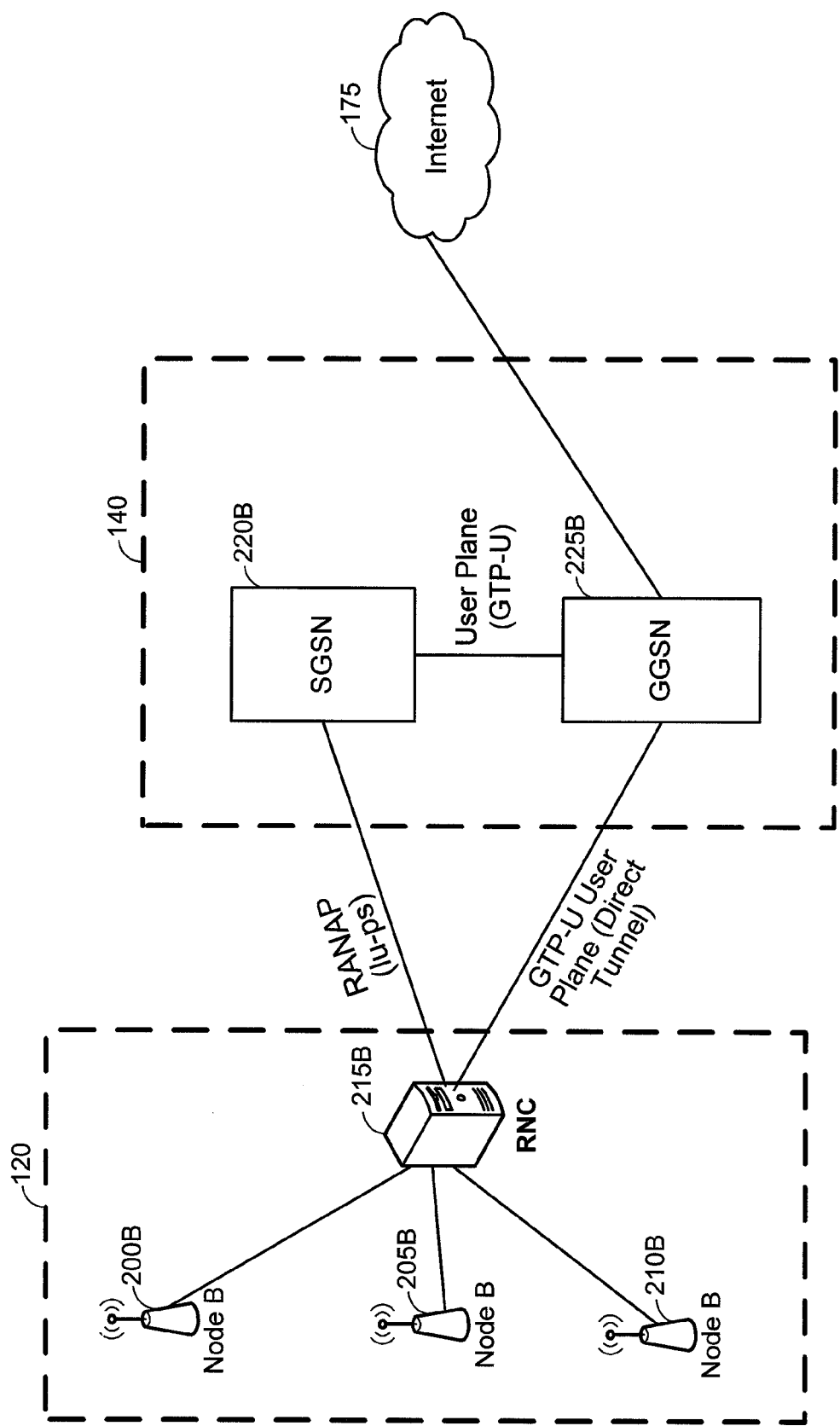
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
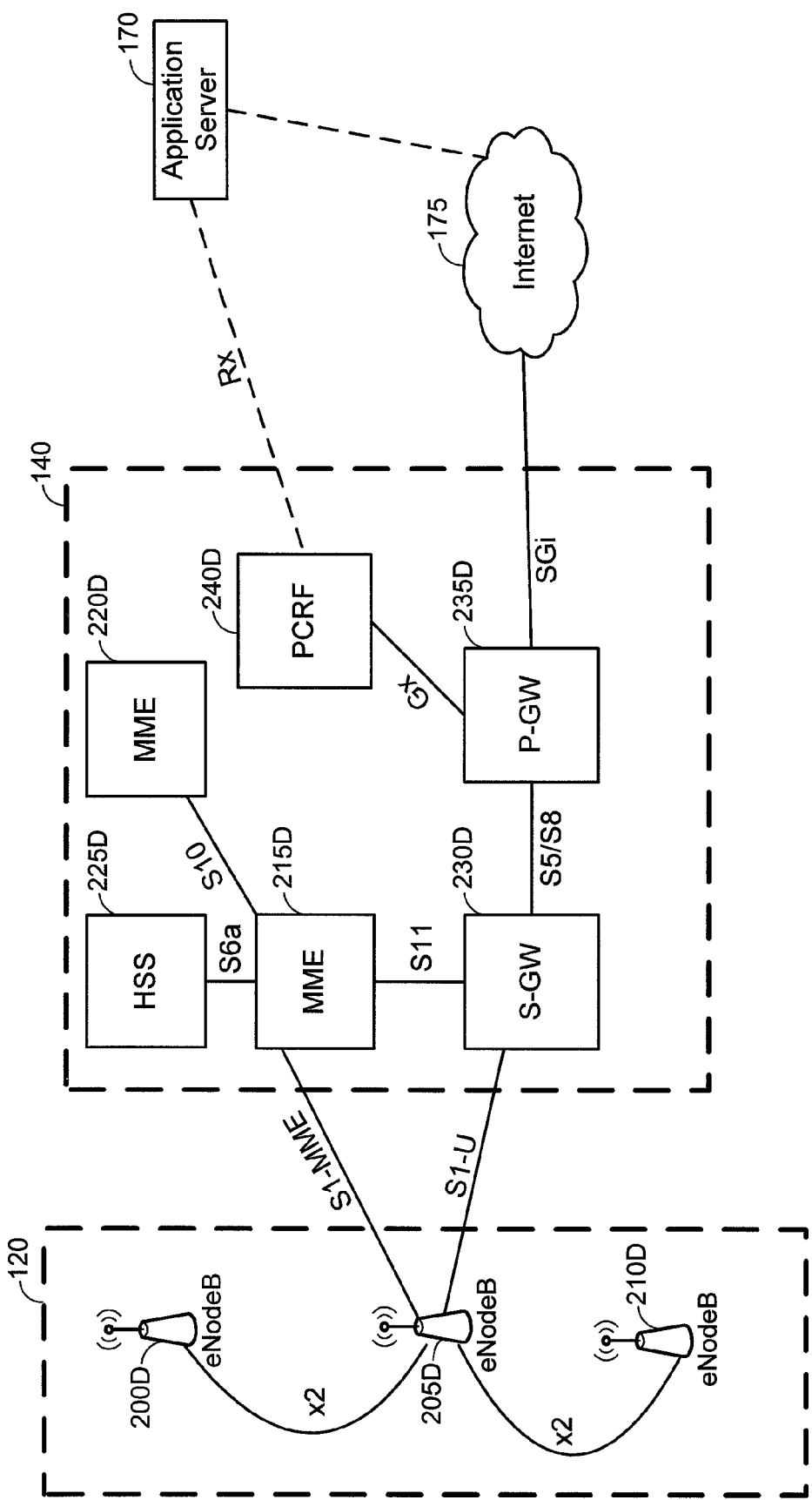
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMES) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |

TABLE 1-continued

EPS/LTE Core Network Connection Definitions

| Network Interface | Description |
|---|---|
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
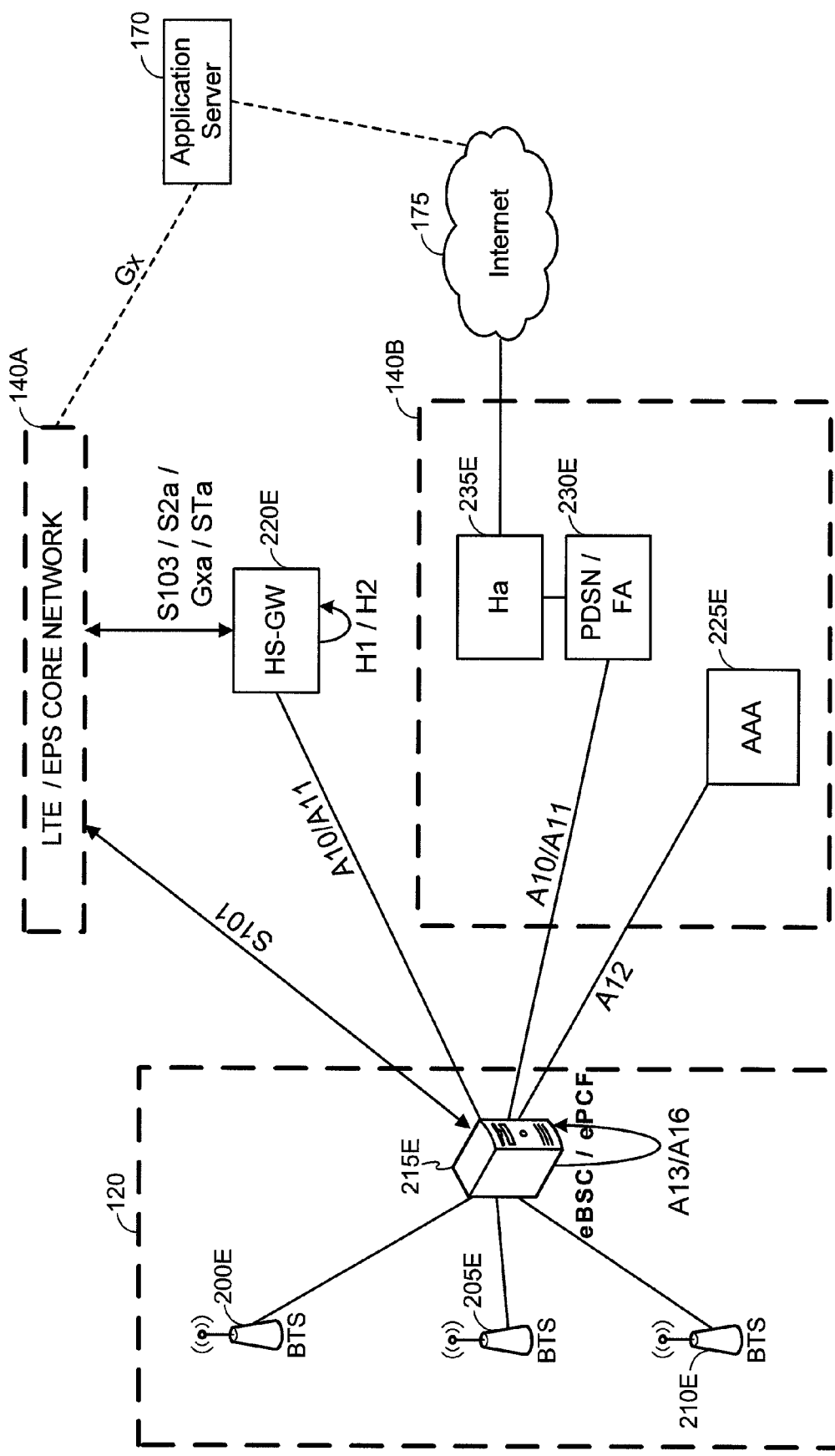
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 230D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
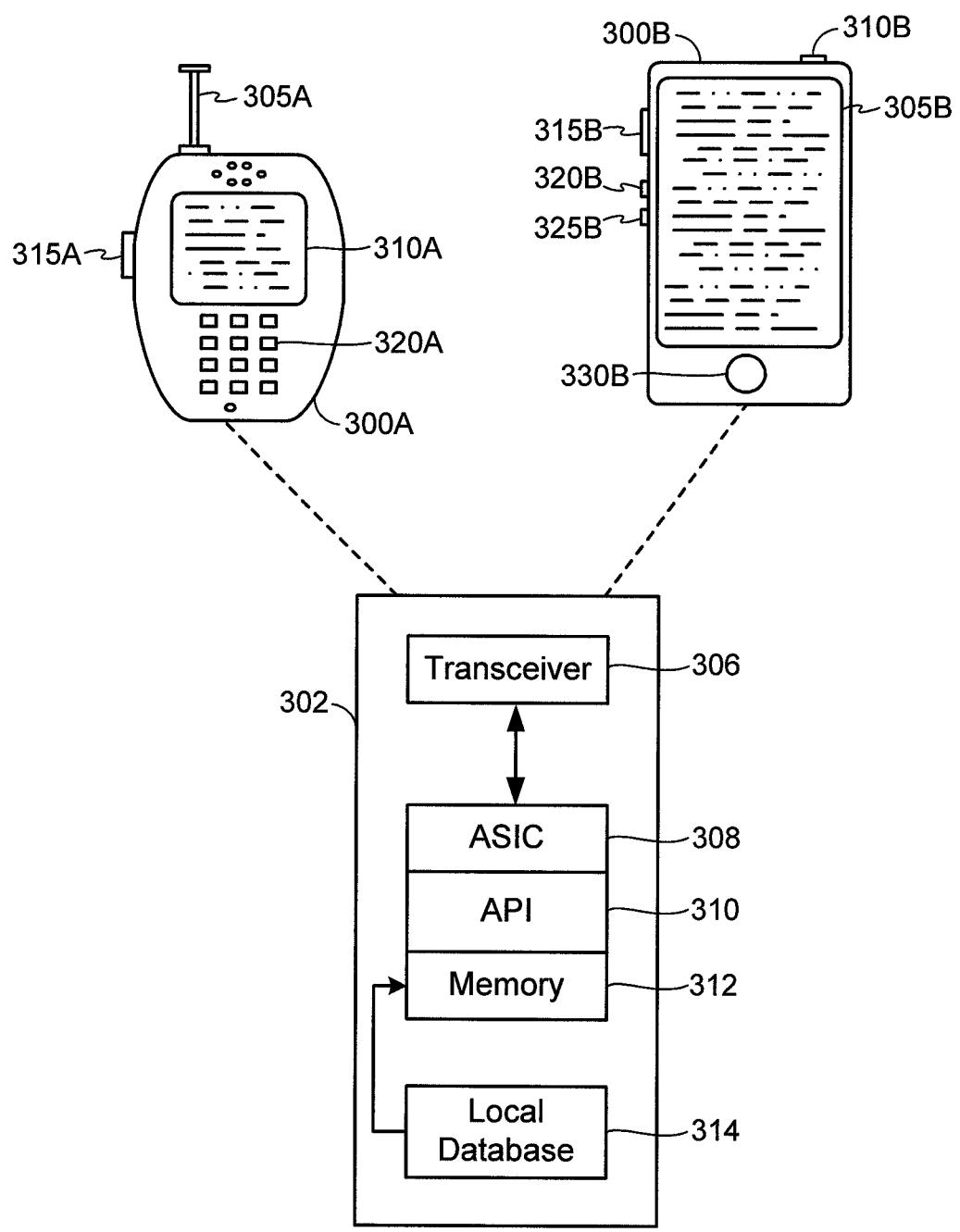
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
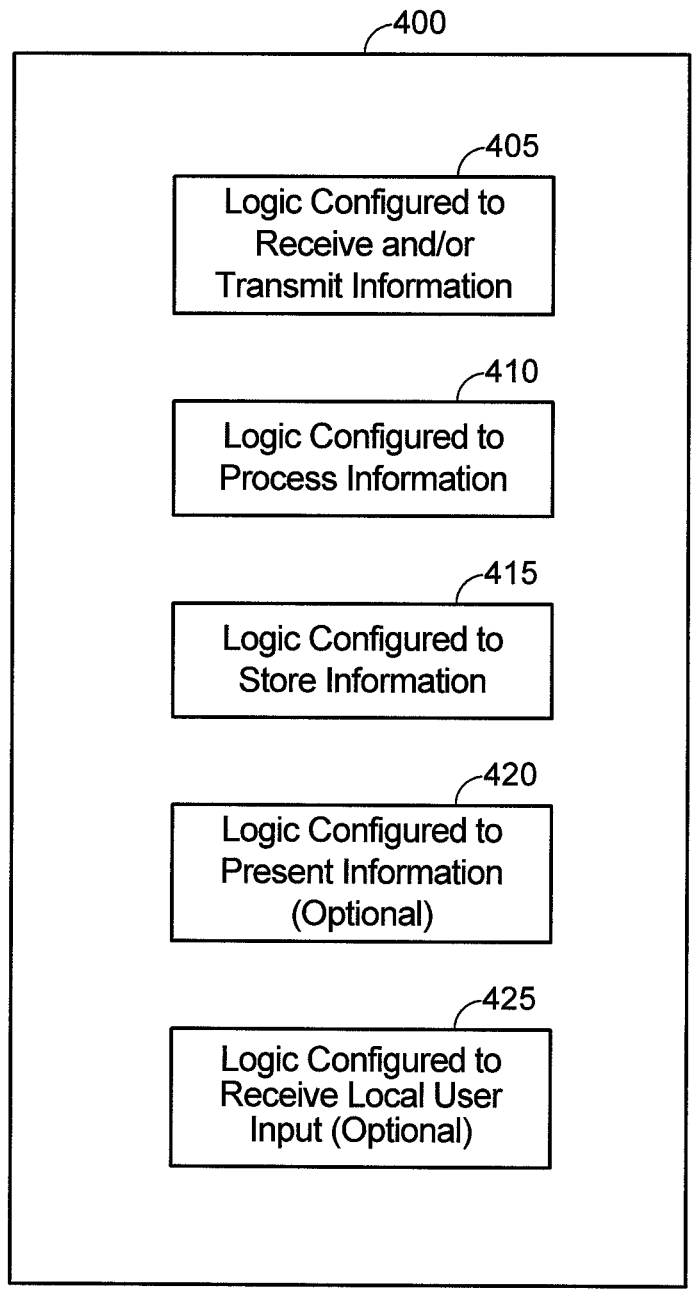
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Sessions that operate over networks such as 1×EV-DO in FIG. 2A, UMTS-based W-CDMA in FIGS. 2B-2C, LTE in FIG. 2D and eHRPD in FIG. 2E can be supported on channels (e.g. RABs, flows, etc.) for which a guaranteed quality level is reserved, which is referred to as Quality of Service (QoS). For example, establishing a given level of QoS on a particular channel may provide one or more of a minimum guaranteed bit rate (GBR) on that channel, a maximum delay, jitter, latency, bit error rate (BER), and so on. QoS resources can be reserved (or setup) for channels associated with real-time or streaming communication sessions, such as Voice-over IP (VoIP) sessions, group communication sessions (e.g., PTT sessions, etc.), online games, IPTV, and so on, to help ensure seamless end-to-end packet transfer for these sessions.

In EV-DO networks as in FIG. 2A, a UE can request a particular QoS level ("QoS resources") to be associated with a communication session. If the RAN 120 has sufficient QoS resources in the UE's sector, the QoS level can be allocated to the requesting UE.

Figure 5:
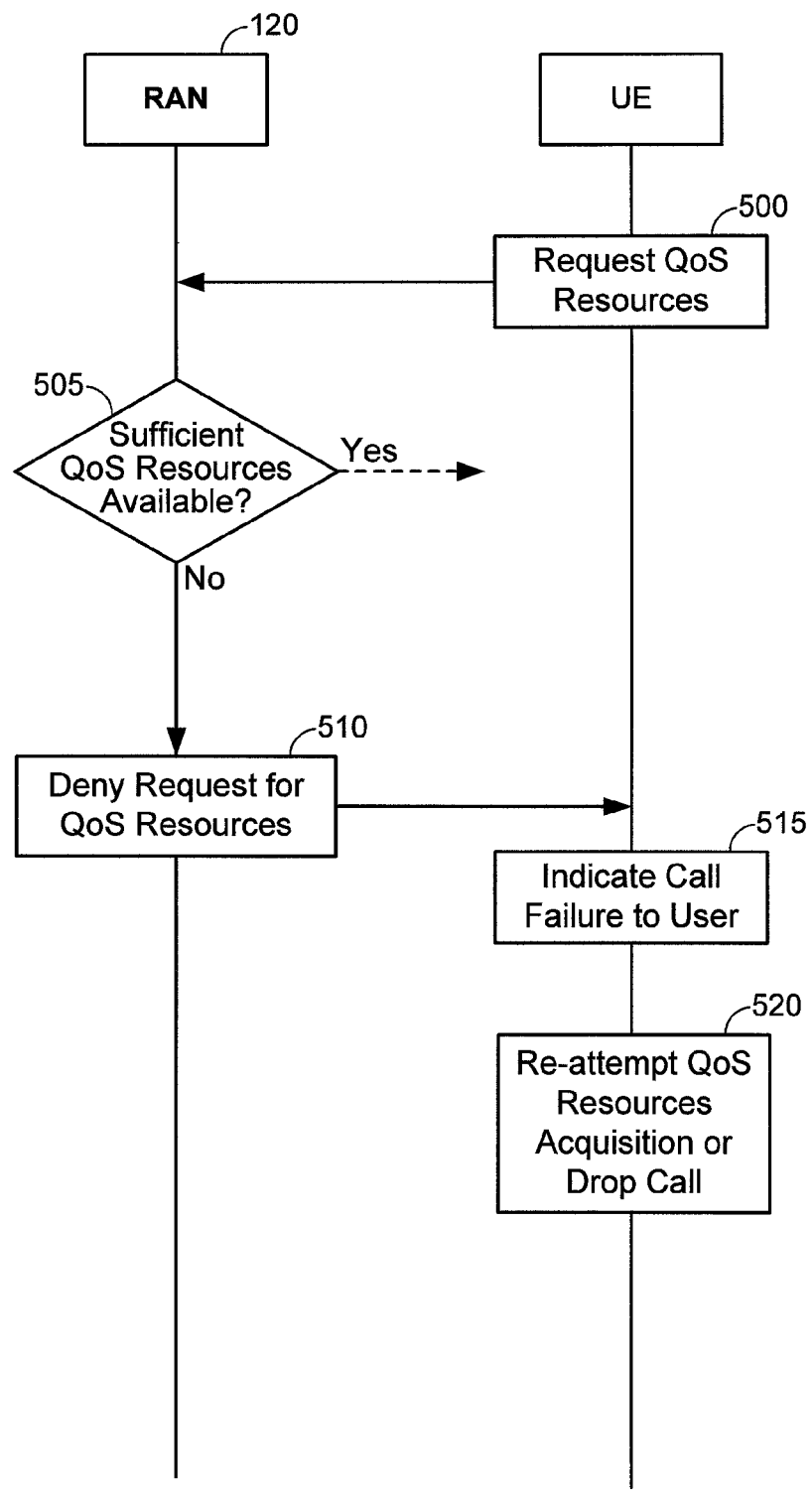
FIG. 5 illustrates a conventional manner of requesting QoS resources that the RAN determines to be unavailable.

FIG. 5 illustrates a conventional manner of requesting QoS resources that the RAN 120 determines to be unavailable. Referring to FIG. 5, a given UE sends a message on a reverse link access channel to the RAN 120 to request a given amount of QoS resources, 500 (e.g., bandwidth, latency and/or jitter requirements for a call). For example, in 1×EV-DO Rev. A or 1×EV-DO Rev. B networks, the QoS request of 500 may correspond to a ReservationOnRequest message on the reverse link access channel. While not shown in FIG. 5, other messaging may also be exchanged between the RAN 120 and the given UE, such as a ConnectionRequest message to obtain a traffic channel (TCH) for the given UE, a ChannelAssignment message allocating the TCH to the given UE on the downlink, etc.

The RAN 120 receives the request for QoS resources and determines whether sufficient QoS resources are available with the given UE's sector for allocation to the given UE, 505. For example, the determination of 505 can be based on the RAN 120's QoS resource obligations to other UEs within given UE's sector. In 505 of FIG. 5, assume that the RAN 120 determines that sufficient QoS resources are not available for the given UE. In other words, the RAN 120 cannot accommodate the given UE's request for QoS resources. In this case, the RAN 120 sends a message on a downlink channel to the given UE indicating that the given UE's QoS request for resources has been denied, 510. For example, in 1×EV-DO Rev. A or 1×EV-DO Rev. B networks, the denial message of 510 may correspond to a Fwd/RevReservationReject message on the downlink channel.

In 515, the given UE notifies its user of the call failure. After the given UE receives the message indicating that the QoS resource request has been denied, 520, and indicates the call-failure to the user, 515, the user of the given UE can instruct the given UE to either re-attempt to obtain QoS resources from the RAN 120 (e.g., by sending another ReservationOnRequest on the reverse link access channel to the RAN 120, as in 500), or to drop the call. As will be appreciated by one of skill in the art, call failures can frustrate subscribers, can cause subscribers to abandon call attempts and/or can otherwise degrade the subscriber's experience with the service, as discussed above.

With respect to FIG. 5, if the QoS-dependent application requires the EV-DO or HRPD RAN 120 to provide a certain QoS guarantee in order for a given multimedia application (denoted as "App*", described below in more detail) to offer service, where the QoS guarantee (or reservation) is obtained (1) first requesting QoS from the RAN 120 at "call time" and either (2A) offering the service if the RAN 120 is able to grant the requested QoS at call-time or (2B) denying access to the service until the next call attempt if the RAN 120 is not able to grant the QoS at call-time. In the case of (2A), the application is assumed to release the granted QoS when the call terminates.

Multiple approaches for providing a graceful degradation in service availability for an application that nominally requires a high-level of QoS resources from an EV-DO network are described below with respect to FIGS. 6A through 7B. In each approach, the logic surrounding how the application (e.g., a multimedia application) itself requests QoS at "call-time" is modified to allow for a graceful degradation of service availability. As used herein the term "call" refers to any communication session within a wireless network (e.g., a PTT call, video streaming, etc.) and "call time" refers to the initial communication to setup and/or establish the communication session. The multimedia application is denoted below as App*, whereby App* can correspond to any application that requires QoS resources on a media flow for supporting its communication sessions (e.g., PTT sessions, VoIP sessions, etc.). App* may be embodied with a client-side application that executes on UEs (denoted as App* client application or simply App*), as well as server logic that executes at the application server 170 for supporting network communications for App*.

In one embodiment, the App* client application nominally always requests QoS at call-time as described above, but ignores the result of requesting QoS for the purpose of determining whether the call can proceed. The App* client application uses any provided QoS guarantee to place the call when the RAN 120 is able to provide the requested QoS guarantee, but also allows the call to proceed without the requested QoS guarantee in the event the RAN 120 is not able to provide the requested QoS guarantee.

This embodiment provides for a graceful degradation in service by allowing a high-quality version of App* to be offered when the RAN 120 is able to provide the QoS guarantee, and a lower (e.g., degraded) version of App* to be offered when the RAN 120 is not. However, because the degraded form of App* is offered without the benefit of any QoS guarantees, the degraded form of the App* service can be highly dependent on RAN 120 performance when the requested QoS guarantee is not available. Conventionally, as will be appreciated from the description of FIG. 5 above, the RAN 120 will simply fail QoS in the event a requested service level is unavailable for assignment, and will not provide a degraded level of service. EV-DO or HRPD RANs are generally designed to honor specific QoS profiles and not to make decisions in the event that the entire profile cannot be honored.

The QoS request may be conventional or may be bundled with other messages in an initial communication. For example, the QoS resource request message (e.g., the ReservationOnRequest message in 1×EV-DO networks) may be sent independently of other messages (i.e., non-bundled). In another example, the ReservationOnRequest message may be bundled with other messaging, such as a ConnectionRequest message that requests a TCH assignment, a Data-over-Signaling message, and the like.

Figure 6A:
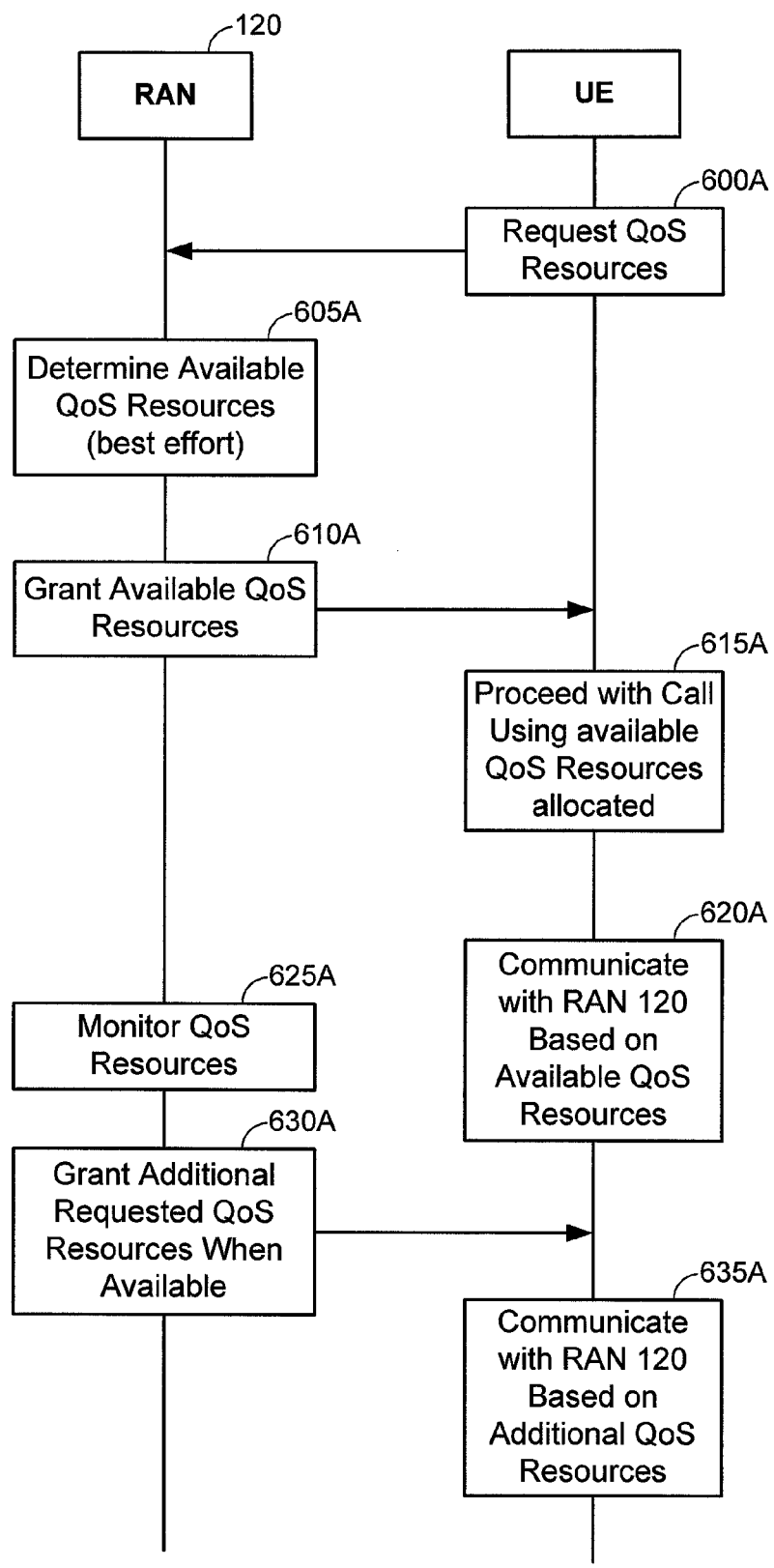
FIG. 6A illustrates a QoS resource acquisition process in an EV-DO network in accordance with an embodiment of the invention.

FIG. 6A illustrates a QoS resource acquisition process in an EV-DO network in accordance with an embodiment of the invention. Referring to FIG. 6A, in 600A, a given UE sends a message (e.g., on a reverse link access channel) to the RAN 120 to request a given amount of QoS resources, (e.g., based on the requirements for the call). Upon receiving the QoS resource request message at the RAN 120, the RAN 120 determines whether sufficient QoS resources are available for allocation to the given UE, 605A. While not shown expressly in FIG. 6A, if sufficient QoS resources are determined to be available in 605A, the QoS resources are allocated to the given UE. In this example, assume that sufficient QoS resources are determined not to be available in 605A. The RAN 120 also determines the level of QoS resources that are available for allocation to the given UE at 605A, and the RAN 120 grants the determined level of QoS resources, 610A. After sending the QoS resource request message in 600A, the given UE simply assumes that at least some level of QoS resources will be allocated by the RAN 120. Accordingly, the given UE continues the call set-up process regardless of which (if any) of the requested QoS resources are reserved or guaranteed for the given UE. Thus, the given UE proceeds with the call, 615A, irrespective of whether any or all of the requested QoS resources are actually granted by the RAN 120, and if possible, the QoS resources that are granted at 610A (if any) are used during the call, 620A.

As will be appreciated, the determined amount of QoS resources (i.e., the RAN 120's 'best effort' at satisfying the QoS resource request message) is less than the amount of QoS resources requested by the given UE, because the RAN 120 determined in 605A that the requested amount of QoS could not be granted. Again, it is understood that the RAN 120 would simply grant the requested QoS resources if those resources are available.

Returning to FIG. 6A, assume that the RAN 120 may maintain, for a period of time, the initial QoS resource request message received from the given UE at 600A. During the given UE's call, the RAN 120 continues to monitor its available QoS resources, 625A. Accordingly, if the monitoring of 620A indicates that additional QoS resources become available during the call, the RAN 120 may, on its own initiative (e.g., without receiving a subsequent ReservationOnRequest message) determine if the requested QoS can be granted. If so, the RAN 120 grants the newly available QoS resources to the given UE, 630A. After the supplemental QoS allocation of 630A, the given UE communicates with the RAN 120 based on the granted QoS resources, 635A. The monitoring and additional QoS resource allocation of 625A and 630A, respectively, may continue until the amount of QoS resources indicated by the QoS resource request message of 600A is allocated to the given UE. Accordingly, even though the 'best effort' QoS resources are allocated relatively quickly in 610A, this does not preclude the RAN 120 from sending a later message granting a higher level of QoS resources (e.g., the full requested level).

In FIG. 6A, the QoS resource request of 600A has been described for an initial call attempt. However, it is possible that the process of FIG. 6A can alternatively describe a subsequent call attempt (e.g., a second call attempt) that follows an earlier call attempt, as will now be described with respect to FIG. 6B.

Figure 6B:
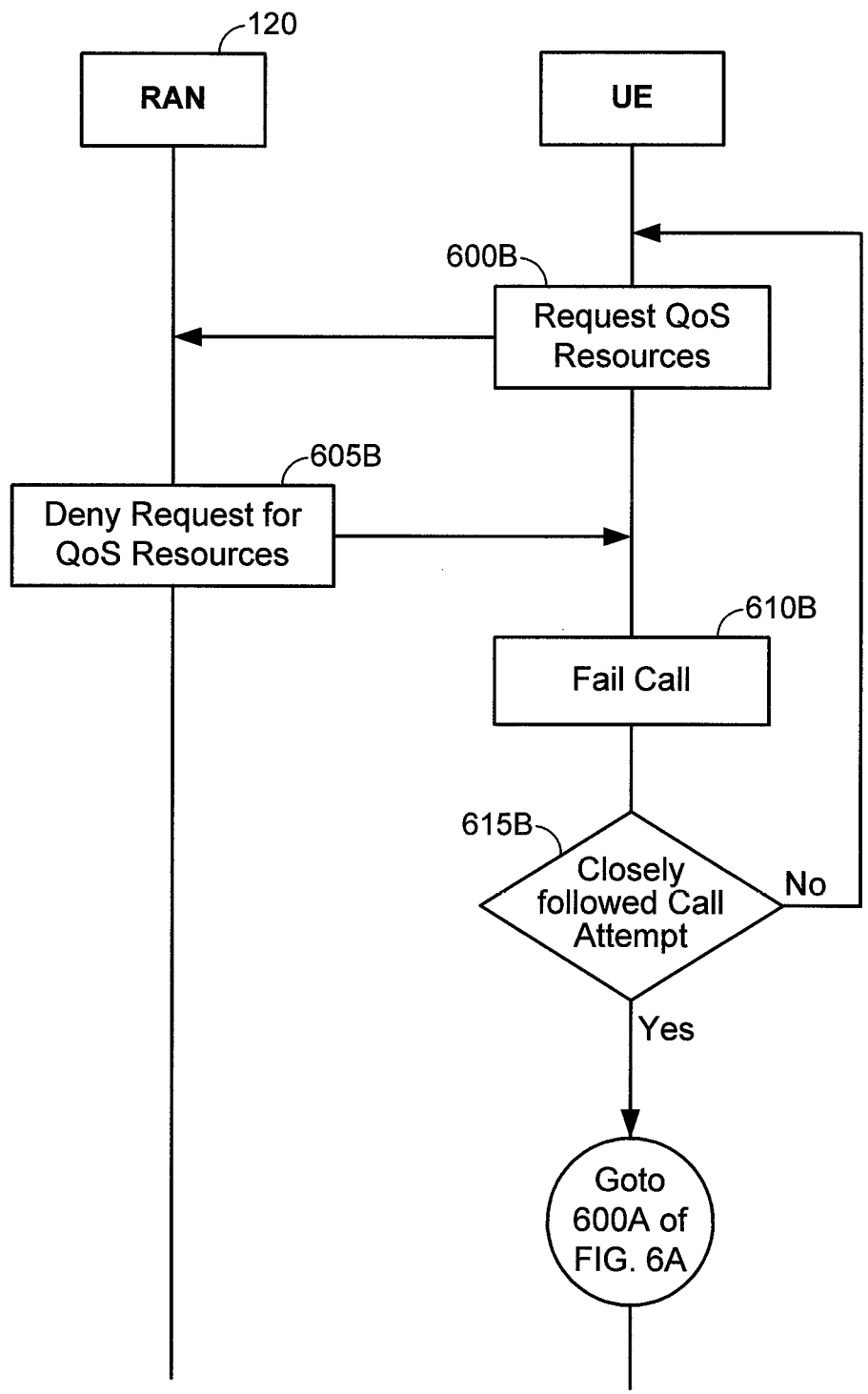
FIG. 6B illustrates an initial call attempt that results in call failure before execution of the process of FIG. 6A in accordance with an embodiment of the invention.

In FIG. 6B, App* nominally requests QoS at call-time, as described above, and fails the call when the requested QoS guarantee cannot be provided by the EV-DO RAN 120. However, for a (subsequent) call attempt that closely follows (e.g., within a relatively short period of time) a call attempt that failed due to the RAN 120 previously not being able to offer the requested QoS guarantee at call-time, App* requests QoS but ignores the result of the QoS request for the purpose of determining whether the subsequent call can proceed. App* uses any provided QoS guarantee to place this subsequent call when the RAN 120 is able to provide the requested QoS guarantee, but also allows the subsequent call to proceed without the requested QoS guarantee in the event the RAN 120 is not able to provide the requested QoS guarantee.

The embodiment of FIG. 6B thereby results in a graceful degradation in service by allowing a high-quality version of App* to be offered when the RAN 120 is able to provide the QoS guarantee, and a lower (degraded) version of App* to be offered after an initial failure when the RAN 120 is not. The algorithm provides a degraded form of App* service that is highly dependent on the RAN 120's performance only when the requested QoS guarantee cannot be initially provided available; otherwise, App* provides the high-quality version of the service after a single initial failure.

Referring to FIG. 6B, in 600B, the given UE sends a message (e.g., on a reverse link access channel) to the RAN 120 to request a given amount of QoS resources for App*. In the example of FIG. 6B, it is assumed that the QoS resource request of 600B is associated with an initial call attempt (i.e., a first time the given UE has attempted to make a particular call within a threshold period of time). The QoS resource request may otherwise be configured as discussed above with respect to 600A of FIG. 6A (e.g., as part of a bundled call request message that also requests a traffic channel, as an independent message, etc.). The RAN 120 receives the QoS resource request, and denies the requested QoS resources in 605B. After receiving the denial of the QoS resource request, the given UE indicates to a user of the given UE that the call has failed, 610B, and an attempt to make the call, if it closely follows the original call attempt, 615B, follows the process defined in FIG. 6A. Specifically, if the given UE determines to re-attempt the call, the process advances to 600A of FIG. 6A. Alternatively, if the re-attempt does not closely follow the initial attempt, the process will just indicate the call has failed and possibly return to the top to repeat the initial request, 600B.

Accordingly, in the example of FIG. 6B, the process of FIG. 6A is executed for a subsequent call attempt instead of during an initial call attempt. Thus, in this example, the call set-up that occurs irrespective of whether QoS resources are granted occurs after an initial call failure.

In FIG. 6B, App* nominally always requests QoS at call-time as described above, but waits a prescribed period of time before failing the call when the requested QoS guarantee cannot be provided by the network (RAN 120). During a prescribed period of time, if the requested QoS guarantee becomes available (late), App* allows a delayed form of the original call to proceed rather than failing the call. If the requested QoS guarantee does not become available during the prescribed period, App* fails the call. According to embodiments of the invention, the prescribed period of time can be either predefined or configurable by either the operator offering the application or the user using the service.

The embodiment of FIG. 6B can result in a graceful degradation in service by allowing a high-quality version of App* to be offered when the RAN 120 is able to provide the QoS guarantee, and a lower (degraded) version of App* to be offered after an initial failure when the RAN 120 is able to offer the requested QoS guarantee after a delay. The algorithm is useful in offering a degraded form of the service when the ability of the RAN 120 to provide requested QoS guarantee is highly dependent on the specific instance of when the request is made. As such the degraded form of App* takes the form of a delayed version of the original high-quality service in the embodiment of FIG. 7A, discussed next.

Figure 7A:
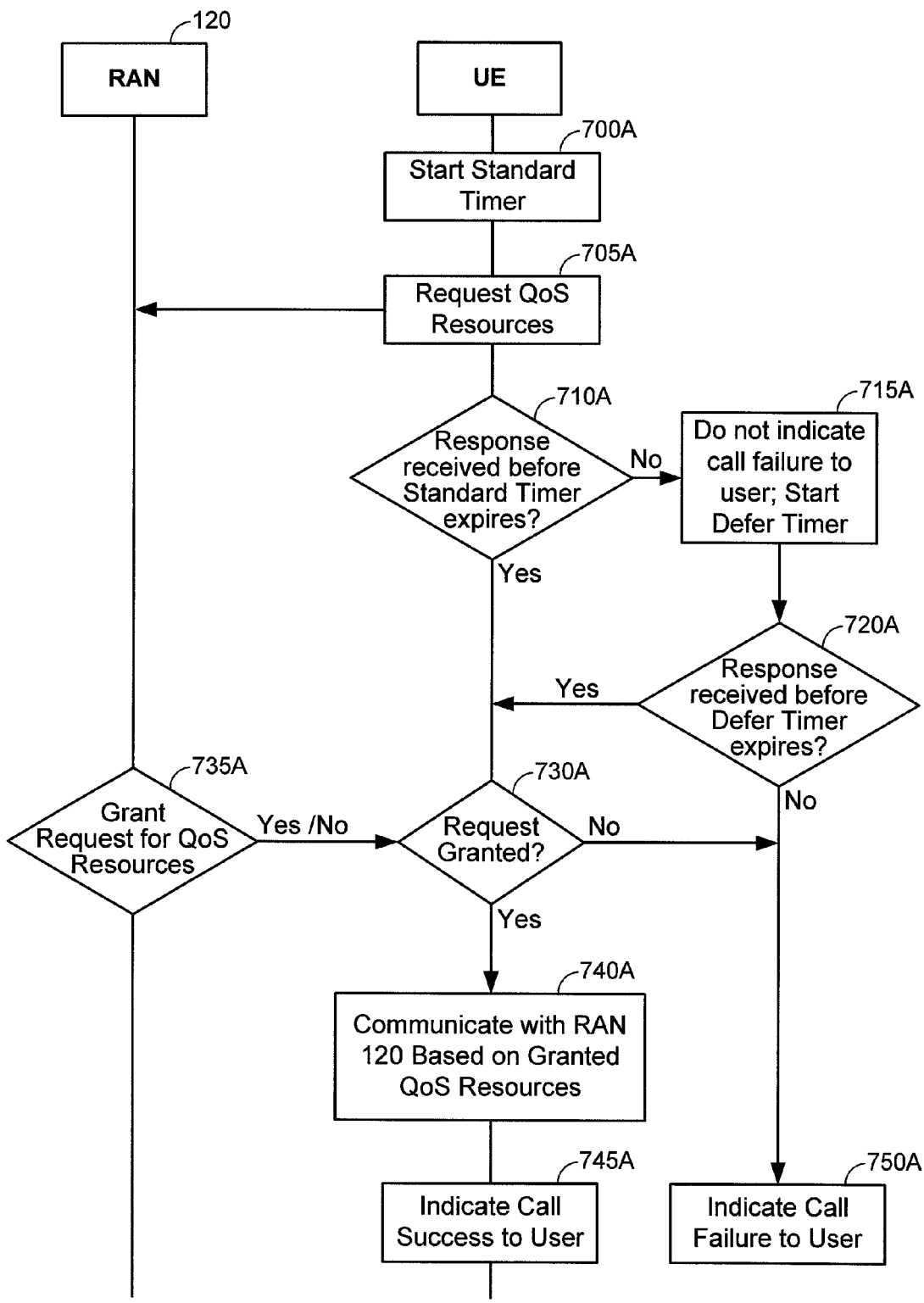
FIG. 7A illustrates a QoS resource acquisition process according to an embodiment of the invention.

FIG. 7A illustrates a QoS resource acquisition process according to an embodiment of the invention. In 700A, the given UE a standard timer having a given expiration period, 705A. In an example, the given expiration period can be a default expiration period, or can be set by an operator of the RAN 120. The standard timer corresponds to the timer that is used conventionally to detect whether a timeout has occurred with respect to a QoS resource request.

Accordingly, in 705A, the given UE sends a message (e.g., on a reverse link access channel) to the RAN 120 to request QoS resources. For example, in 1×EV-DO Rev. A or 1×EV-DO Rev. B networks, the request of 705A may include a ReservationOnRequest message on the reverse link access channel. In another example, the ReservationOnRequest message may be bundled with other messaging, such as a ConnectionRequest message that requests a TCH assignment, as discussed above, for a given call (e.g., a PTT call). While the standard timer is illustrated in FIG. 7A as starting before the QoS resource request is transmitted in 705A, in another embodiment the standard timer can be started after the QoS resource request is sent. In any case, the starting of the standard timer generally approximates the time at which the QoS resource request is sent.

In 710A, the given UE determines whether a response to the QoS resource request is received before an expiration of the standard timer. In an example, assume that the given UE determines that no QoS response has been received 710A, and the process advances to 715a. At this point, a conventional UE would infer that QoS resources would not be granted and would fail the call. However, in 715A, the given UE refrains from indicating call failure and starts a second Defer Timer. It will be appreciated that while both a first timer (i.e., standard timer) and a second timer (i.e., defer timer) are implemented within the embodiment of FIG. 7A, in another embodiment of the invention, the first and second timers can be replaced by a single timer having an expiration period that is longer than the standard timer's expiration period (e.g., equal to the expiration period of the standard timer plus the expiration of the defer timer). Essentially, starting the defer timer permits the given UE a longer wait-time before inferring that it will not be assigned QoS resources by the RAN 120 for a particular QoS resource request. Thus, reference to the Defer Timer is intended to encompass either (i) starting a separate timer after expiration of the standard timer, or (ii) a timer period extending beyond that of the standard timer where the standard timer period and defer timer period correspond to a single timer, unless one of these alternative embodiments is referred to explicitly.

Accordingly, in 720A, the given UE determines whether a QoS response has been received before the Defer Timer has expired. If a response is received before the Defer Timer has expired, the process advances to 730A. Otherwise, if the defer timer has expired, the given UE indicates, to the user of the given UE, that the call attempt has failed, 725A.

Turning to the RAN 120, after the QoS resource request is received in 705A, the RAN 120 determines whether to grant the QoS resource request, 735A. In 735A, if the RAN 120 determines not to grant the QoS resource request, the RAN 120 sends a QoS resource denial message (e.g., Fwd/RevReservationOff message). Otherwise, in 735A, if the RAN 120 determines to grant the QoS resource request, the RAN 120 sends a QoS resource grant message (e.g., Fwd/RevReservationOn message).

Turning back to the given UE, the given UE receives the QoS resource allocation message sent by the RAN 120 (e.g., as indicated by a "Yes" in decision block 710A or 720A, depending on when the QoS resource allocation message is received), and determines that whether its requested QoS resources have been granted in 730A. In 730A, if the given UE determines that its requested QoS resources have not been granted, the given UE indicates call failure to the user in 750A.

Otherwise, if the given UE determines that its requested QoS resources have been granted in 730A, the given UE communicates with the RAN 120 and supports the call based on the granted QoS resources, 740A, and the given UE indicates call success to the user, 745A.

In FIG. 7A, the QoS resource request of 705A has been described for an initial call attempt. However, it is possible that the process of FIG. 7A can alternatively describe a subsequent call attempt (e.g., a second call attempt) that follows an earlier call attempt, as will now be described with respect to FIG. 7B.

Figure 7B:
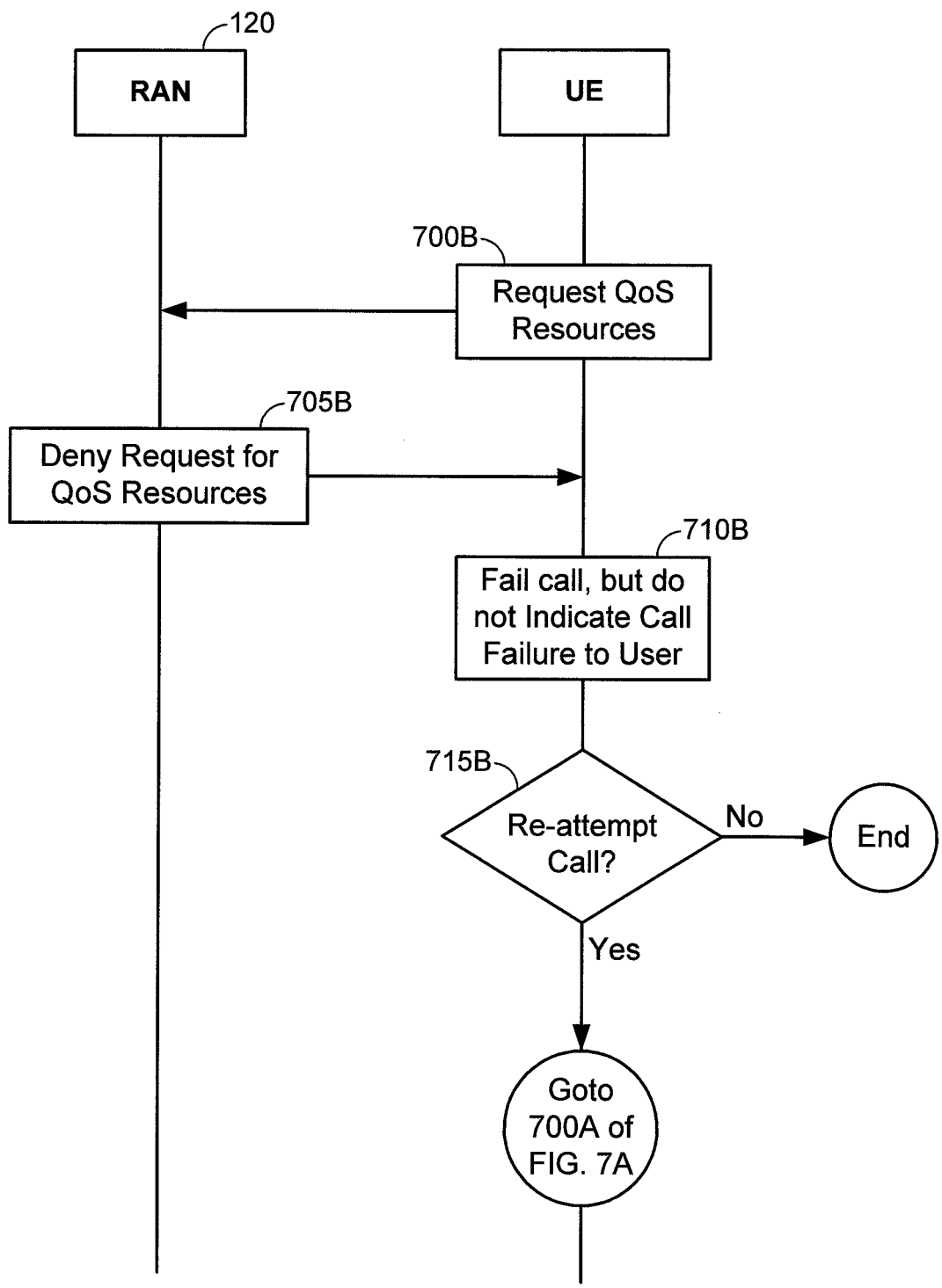
FIG. 7B illustrates an initial call attempt that results in call failure before execution of the process of FIG. 7A in accordance with an embodiment of the invention.

In FIG. 7B, aspects of some of the prior discussed embodiments are combined. App* nominally always requests QoS at call-time as described above, and fails the call when the requested QoS guarantee cannot be provided by the RAN 120. However, for a (subsequent) call attempt that immediately follows a call attempt that failed due to the RAN 120 previously not being able to offer the requested QoS guarantee at call-time, App* waits a prescribed period of time before failing the subsequent call when the requested QoS guarantee cannot be provided by the RAN 120. During the prescribed period of time, if the requested QoS guarantee becomes available (late), App* allows a delayed form of the subsequent original call to proceed rather than failing the subsequent call. If the requested QoS guarantee does not become available during the prescribed period, App* fails the subsequent call.

Referring to FIG. 7B, in 700B, the given UE sends a message to the RAN 120 to request QoS resources. In the example of FIG. 7B, assume that the QoS resource request of 600B is associated with an initial call attempt (i.e., a first time the given UE has attempted to make a particular call within a threshold period of time). The QoS resource request may otherwise be configured as discussed above with respect to 705A of FIG. 7A (e.g., as part of a bundled call request message that also requests a traffic channel, as an independent message, etc.). The RAN 120 receives the QoS resource request, and denies the requested QoS resources in 705B (e.g., as in 505 and 510 of FIG. 5). After receiving the denial of the QoS resource request, the given UE fails the call, but does not indicate that the call attempt has failed to a user of the given UE, 710B. The given UE determines whether to re-attempt the call, 715B. In an example, the given UE can automatically determine to re-attempt the call after an initial call failure without waiting for an explicit request from the user of the given UE (e.g., because the user of the given UE is not informed of the initial call failure). If the given UE determines to re-attempt the call, the process advances to 700A of FIG. 7A.

Accordingly, in the example of FIG. 7B, the process of FIG. 7A is executed for a subsequent call attempt instead of an initial call attempt. Thus, in the example of FIG. 7B, the prolonged wait period at the given UE for a QoS resource grant is only invoked after an initial call attempt failure. In another example, while not shown in FIG. 7A and/or FIG. 7B, each subsequent call attempt following a second call failure based on the process of FIG. 7A may be performed in accordance with FIG. 7A, such that the prolonged wait period is used for each such call attempt (e.g., because a user of the given UE may be more concerned with setting up the call with QoS resources than setting up a call in a timely manner).

Further, in an embodiment of the invention, in FIG. 7B, the second QoS resource request (e.g., and/or any subsequent call requests) of the second call attempt upon executing the process of FIG. 7A after determining to re-attempt the call in 715B may be associated with reduced QoS resources (e.g., less stringent requirements). Alternatively, the second QoS resource request may be associated with the same QoS resources as requested in the first QoS resource request.

While FIGS. 5-7B focus primarily upon QoS setup procedures within an EV-DO or HRPD network, FIGS. 8-13 are directed to QoS setup procedures within an LTE network (or eHRPD network). In LTE networks, QoS bearers with GBR ("GBR QoS bearers", or "GBR EPS bearers" if specifically in LTE), LTE core networks maintain QoS reservations on both the air interface at the RAN 120 (or eNodeB 205D) and also S5 connections at the LTE core network when an associated UE is determined to transition into the RRC-Connected state. FIGS. 8-13 each illustrate examples by which the QoS reservations at the RAN 120 and/or the LTE core network 140 can be maintained and/or modified while the UE is in RRC-Connected state in association with a GBR application (e.g., App*), and potentially even while the UE is in RRC-Idle state.

Figure 9:
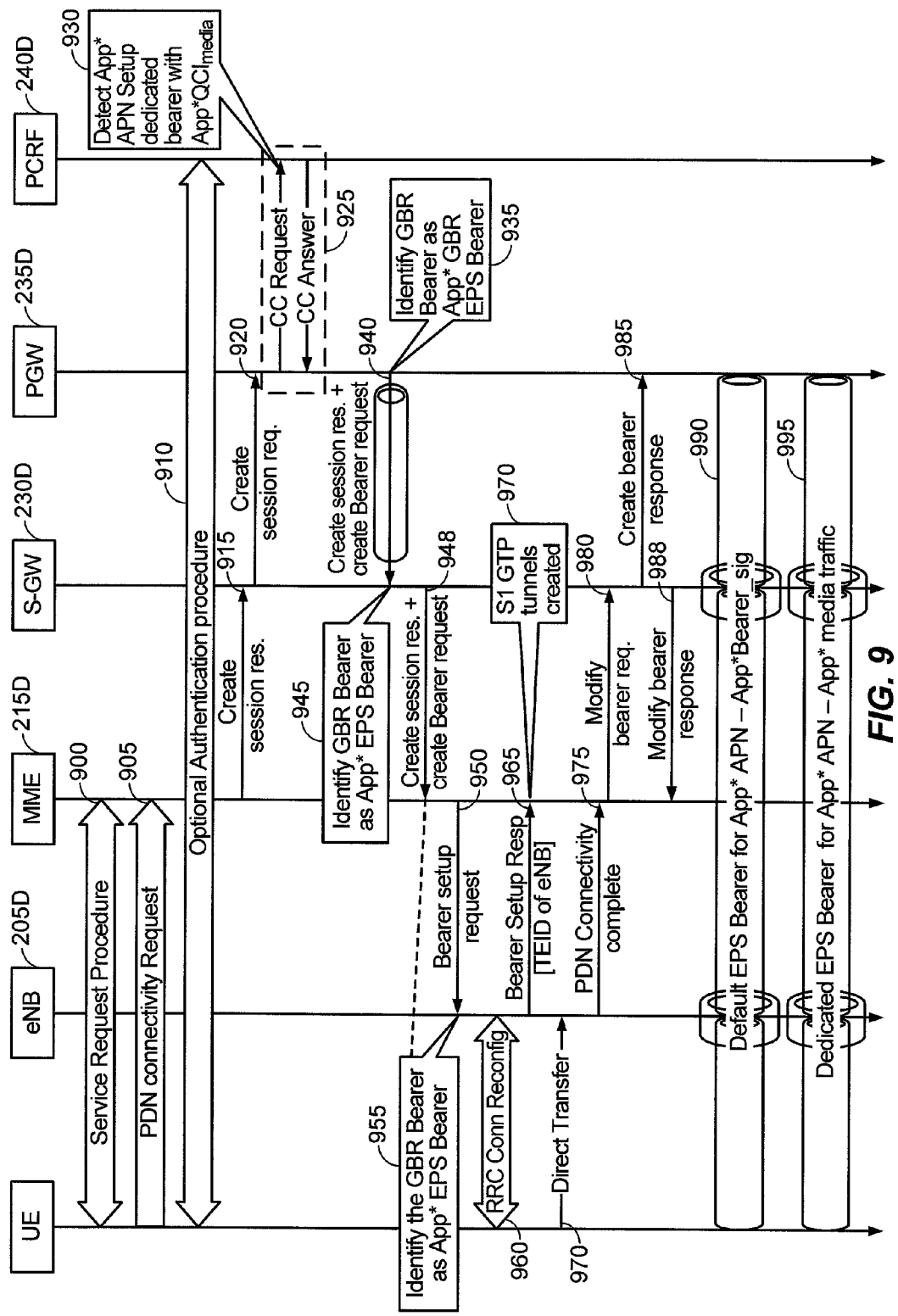
FIG. 9 shows how access point name (APN) information can be exchanged during a QoS setup procedure for a particular GBR EPS bearer that is not 'Always On' in accordance with an embodiment of the invention.

Below, FIG. 8 illustrates an 'Always On' QoS setup procedure for a particular GBR EPS bearer, and FIG. 9 shows how the APN information (or App* identifying information) can be exchanged during a QoS setup procedure for a particular GBR EPS bearer that is not 'Always On'. The App* identifying information exchanged as shown in FIG. 9 can be used to implement selective execution one or more of FIGS. 10 through 15 for QoS bearers associated with particular applications (such as App*).

Referring to FIG. 8, 800 corresponds to an initial procedure whereby a given UE sets up a non-QoS EPS bearer. The setup of the non-QoS EPS bearer begins with the given UE in an RRC-Idle state, 805, after which a System Information reading operation is performed, 810, the Non-Access Stratum (NAS) layer at the given UE initiates EPS attach and PDN connectivity procedures, 815, the given UE and the LTE core network 140 engage in an RRC connection and context set-up procedure, 820, after which the given UE is transitioned into the RRC-Connected state, 825. At this point, a default EPS bearer (or non-GBR QoS EPS bearer) is established for the given UE, 830, and an 'Always On' S5 connection is set-up for the default EPS bearer, 835. The default EPS bearer can be used to support applications that exchange data for which QoS (e.g., GBR, etc.) is not required, such as web-browsing applications, Email applications, and so on.

The remainder of FIG. 8 describes setup of a GBR EPS bearer for a high-priority GBR application, which is denoted as App*. In context with an LTE-specific implementation, App* can correspond to any application that requires GBR QoS on an associated EPS media bearer for supporting its communication sessions (e.g., PTT sessions, VoIP sessions, etc.) and that uses a dedicated Access Point Name (APN), where the dedicated APN is configured to specifically identify App* to external devices, such as components of the LTE core network 140. In non-LTE networks, App* can be supported on other types of QoS bearers.

Accordingly, after 835, the given UE launches App*, 840, sends a PDN Connectivity Request for App* to the MME 215D, 845, and the MME 215D sends a Create Session Request (e.g., configured with EPS Bearer QoS (QCI '5')) to the P-GW/PCRF 235D/240D, 850. At this point, the LTE core network 140 can initiate set-up of the dedicated bearer for App*'s PDN connection, or alternatively the application server 170 or UE can request the dedicated GBR EPS bearer setup, 855. In either case, the P-GW/PCRF 235D/240D sends a Create Session Response message (e.g., which can be configured as (EPS Bearer QoS(QCI '5'))+Create Bearer Request(EPS Bearer QoS(QCI—'QCI$_{App*}$' or '1', GBR UL/DL—'X$_{App*}$'kbps))) to the MME 215D which sets up the GBR EPS bearer with a GBR that is specific to App* (e.g., a nominal data rate such as 1 kpbs, or X$_{App*}$ kpbs), 860. The MME 215D then delivers a Bearer Setup Request message (e.g., which can be configured with (Default EPS Bearer QoS(QCI '5'), Dedicated EPS Bearer QoS(QCI—'QCIApp*' or '1', GBR UL/DL—'XApp*'kbps))) to the eNodeB 215D to set-up the App*-specific GBR, 865, and the eNodeB 215D allocates the GBR for App*'s GBR EPS bearer as requested, 870. App*'s signaling bearer is setup, 875 and 880, and App*'s GBR EPS media bearer is also setup, 885 and 890.

Turning to App* in more detail, App*'s media traffic model can be configured differently than the typical VoIP application traffic. For example, App* can be configured to bundle 6 Vocoder frames into a single RTP packet and to transmit media packets every 120 ms. Thus, the data rate and air interface configurations required for the App* media bearer can be different than a VoIP media bearer, which is referenced as QCI '1' in LTE networks. So, it may not be suitable to use QCI '1' (conversational voice) for App*.

The LTE standard can reserve a QCI in the range 128-255 for certain multimedia applications (e.g., VoIP applications, PTT applications), and can allocate GBR QoS for this QCI. The S-GW 230D and P-GW 235D can identify App*'s GBR EPS bearer during initial bearer setup or bearer setup due to x2 or 51 based handover based on the reserved QCI for App* ("App*QCI", for signaling and/or media), or alternatively based upon QCI '1' where the GBR EPS bearer is associated with an APN that is known to be related to App* (so the LTE core network knows to use App*'s specialized QoS parameters instead of the typical QCI QoS parameters). In an example, the recognition of the App*-specific GBR EPS bearer can be used to prompt the LTE network components (e.g., such as the MME 215D) to identify App*'s GBR EPS bearer and to perform actions based upon this recognition, such as selectively caching the GBR parameters for the GBR EPS bearer of a particular APN for quickly bringing up S5 connections after an RRC Idle-to-Connected transition. The eNodeB 205D can identify App*'s GBR EPS bearer during initial bearer setup bearer setup due to x2 or S1 based handover based on the reserved App*QCI to provide the requested QoS treatment. This procedure is shown in FIG. 9.

Referring to FIG. 9, the given UE, the eNodeB 205D and the MME 215D perform a service request procedure, 900, and the given UE delivers a PDN connectivity request for App* to the MME 215D, 905. Optionally, an authentication procedure can be performed for the given UE with the PCRF 240D, 910. The MME 215D delivers a Create Session Request to the S-GW 230D for App*, 915, and the S-GW 230D delivers a Create Session Request to the P-GW 235D for App*, 920. The P-GW 235D and the PCRF 240D then engage in an IP CAN session, 925, during which the PCRF 240D detects the App* APN, and applies App*QCI$_{signaling}$ to the default bearer and initiates a dedicated bearer with App*QCI$_{media}$, 930.

Referring to FIG. 9, the P-GW 235D identifies the GBR EPS Bearer as an App* EPS Bearer based on App*QCI$_{media}$ and being associated with App*'s APN, 935. The P-GW 235D sends a Create Session Response+Create Bearer Request to the S-GW 230D that indicates App*QCI$_{media}$, 940. The S-GW 230D identifies the GBR EPS Bearer as an App* EPS Bearer based on App*QCI$_{media}$ and being associated with App*'s APN, 945. The S-GW 230D sends a Create Session Response+Create Bearer Request to the MME 215D that indicates App*QCI$_{media}$, 948, and the MME 215D in turn sends a PDN Connectivity Accept+Dedicated Bearer Set Request message to the eNodeB 205D that indicates App*QCI$_{media}$, 950. The MME 215D and the eNodeB 205D identifies the GBR EPS Bearer as an App* EPS Bearer based on App*QCI$_{media}$, 955. The GBR EPS bearer for media is then setup with App*QCI$_{media}$, and the default EPS bearer for App*'s signaling is setup with App*QCI$_{signaling}$, as shown in the signaling between 960-995, which will be readily understood by one of ordinary skill in the art familiar with QoS setup in LTE networks.

FIGS. 8-9 each illustrate call flows by which QoS resources, such as GBR, can be reserved on a GBR EPS media bearer for a particular application type, such as App*. FIGS. 10-13 illustrate examples related to scenarios where the requested QoS resources are initially unavailable when requested. In particular, assume that App* is configured to use QCI '1' or alternatively an application-specific QCI (QCI$_{App*}$) for the GBR EPS media bearer on a dedicated App* PDN connection (App*$_{APN}$). Conventionally, if QCI '1' or QCIApp* is not available for allocation at the time an App* call is being setup, the App* would simply fail. Instead of merely failing the call altogether, FIGS. 10-13 illustrate different procedures by which some level of service can still be obtained for App* for a QoS resource shortfall scenario (i.e., resource availability less than QCI or QCIApp*) at call setup. Accordingly, some aspects of FIGS. 10-13 are similar to FIGS. 6A-7B. However, FIGS. 6A-7B relate to QoS setup in EV-DO networks where QoS is implemented exclusively at the RAN 120, while FIGS. 10-13 are directed to QoS setup in LTE networks where QoS can be implemented both at the RAN 120 and the LTE core network 140 (e.g., shown in FIG. 2D).

With reference to FIGS. 10-13, LTE supports both UE-initiated and network-initiated QoS. For UE-initiated requests, an App* client application can issue requests for additional dedicated bearer setup with a specific QCI (e.g., QCI '1' or QCI$_{App*}$) for a particular PDN connection (e.g., the PDN connection dedicated to App*). For NW-initiated QoS, the P-GW 235D can initiate the setup of an additional dedicated bearer with a specific QCI for the particular PDN connection based on the triggers from either the application server 170, or the PCRF 240D. Also, the P-GW 235D can trigger the dedicated bearer setup based on pre-configured subscriber QoS information retrieved from the HSS 220D, and/or upon detection of PDN connectivity request for a specific APN. In LTE, the eNodeB 205D can only reject the EPS bearer setup request if it does not support the requested QoS (e.g., QCI, ARP, GBR, etc) due to resource constraints or other reasons. Conventionally, in LTE, the given UE is either allocated its requested QoS (e.g., the subscribed QoS level) for the bearer, or else the given UE has no dedicated bearer setup until the given UE or LTE network component initiates a downgraded QoS negotiation.

Figure 10:
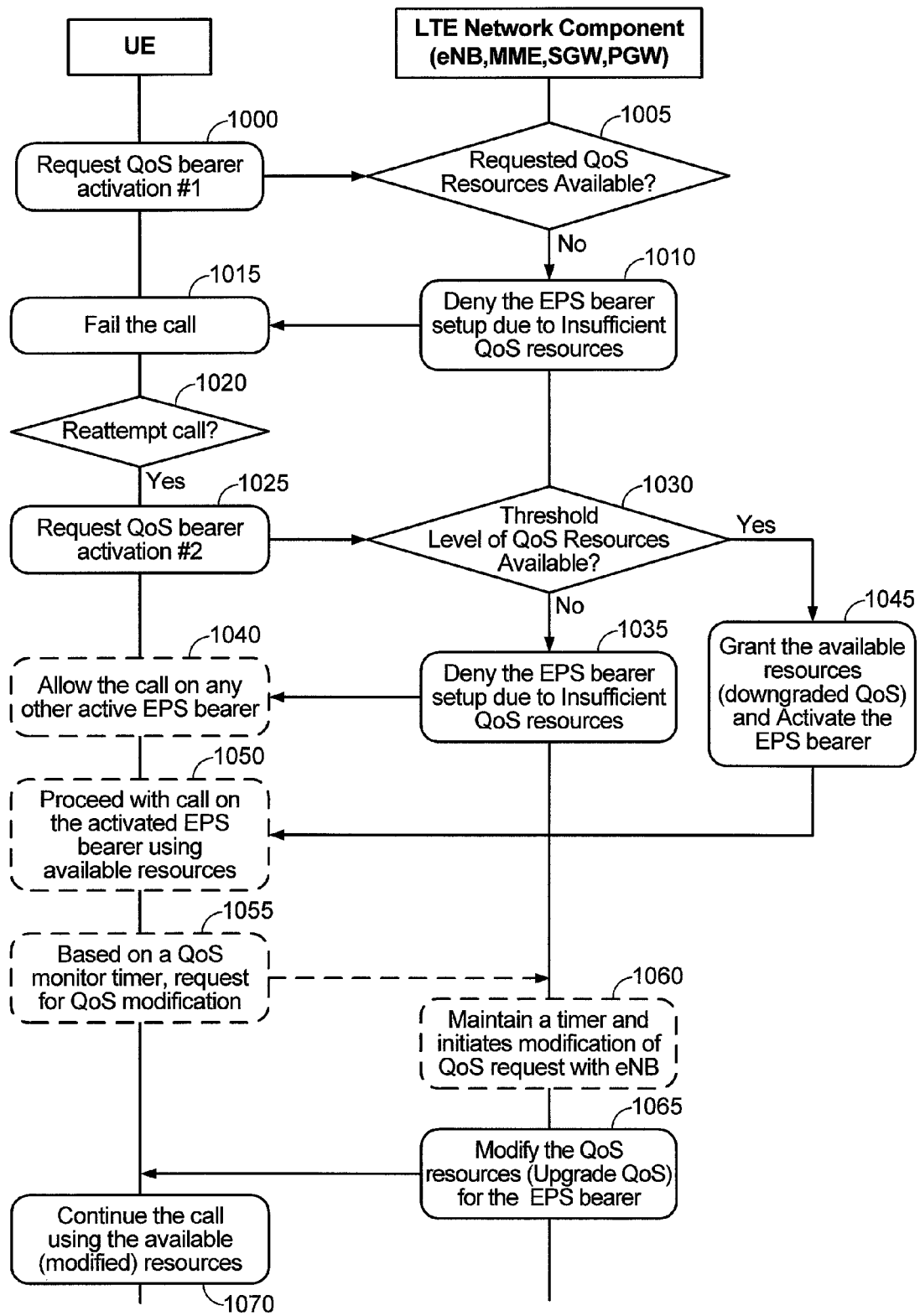
FIG. 10 illustrates a "best effort" Quality of Service (QoS) resource acquisition process in an LTE network operating in accordance with UE initiated QoS in accordance with an embodiment of the invention.

FIG. 10 illustrates a "best effort" QoS resource acquisition process in an LTE network in accordance with an embodiment of the invention. In FIG. 10, interactions between a given UE and an LTE network component are shown considering only UE initiated QoS is supported. The LTE network component can correspond to eNodeB 205D at the LTE RAN 120, or to one of the MME 215D, the S-GW 230D and the P-GW 235D of the LTE core network 140 of FIG. 2D.

Referring to FIG. 10, the App* client application on the given UE transmits a request for activation of a GBR EPS bearer, such as a media bearer for a call being setup for App*, to the MME 215D, 1000. For example, the request of 1000 can correspond to a Request Bearer Resource Modification (App* GBR EPS bearer QoS (QCIApp* or QCI '1')). Upon receiving the activation request for the GBR EPS bearer at 1000, the LTE network components (eNB, S-GW, P-GW) determine whether sufficient QoS resources are available for allocation to the given UE, 1005. While not shown expressly in FIG. 10, if sufficient QoS resources are determined to be available for supporting the GBR EPS bearer in 1005, the GBR EPS bearer is simply activated as requested. In this example, assume that sufficient QoS resources are determined not to be available for activating the GBR EPS bearer in 1005. Accordingly, the GBR EPS bearer setup is denied due to insufficient QoS resources, 1010, and the App* client application on the given UE fails the call, 1015.

After receiving the denial of the GBR EPS bearer activation request, the App* client application on the given UE indicates to a user of the given UE that the call has failed, 1015, and given UE determines whether to re-attempt the call, 1020. In an example, the App* client application on the given UE can automatically determine to re-attempt the call after an initial call failure without waiting for an explicit request from the user of the given UE (e.g., because the user of the given UE is not informed of the initial call failure).

If the App* client application on the given UE determines to re-attempt the call at 1020, the App* client application on the given UE transmits another request for activation of the GBR EPS bearer, such as a media bearer for a call being setup for App*, to MME 215D, 1025. Upon receiving the activation request for the GBR EPS bearer at 1025, the LTE network components (eNB, S-GW, P-GW) again determine whether a reduced level of QoS resources are available for allocation to the given UE, 1030. For example, the determination of 1005 can determine whether QCI '1' or $QCI_{App*}$ is available for reservation to the given UE, whereas the determination of 1030 can determine whether some lesser QoS level is available for reservation to the given UE. If even the reduced level of QoS resources is determined to be unavailable at 1030, the LTE network component denies setup of the GBR EPS bearer due to insufficient QoS resources, 1035. However, instead of simply failing the call again, the client application for App* permits the call to be setup using any active EPS bearer (without GBR QoS), 1040.

Alternatively, if the reduced level of QoS resources is determined to be available at 1030, the LTE network component grants the GBR EPS bearer with the reduced level of QoS resources, 1045, and the client application for App* permits the call to be setup using the activated GBR EPS bearer (with the reduced QoS), 1050.

During the call, the given UE can maintain a QoS monitor timer to monitor the level of QoS allocated to its EPS bearer supporting the call (i.e., the reduced QoS or no QoS), 1055. When this timer expires, the given UE can transmit a request to have a GBR EPS bearer setup with its initially requested QoS (e.g., QCI '1' or $QCI_{App*}$). Alternatively (or in addition), the LTE network component (e.g., the P-GW 235D) can also maintain a QoS monitor timer for the given UE in response to the less than requested QoS being allocated to its EPS bearer supporting the call (i.e., the reduced QoS or no QoS), 1060. When this timer expires, the LTE network component can initiate a GBR EPS bearer to be setup with the given UE's initially requested QoS (e.g., QCI '1' or $QCI_{App*}$). Irrespective of whether the given UE's timer's expiration or the LTE network component's timer's expiration triggers the QoS modification to the EPS bearer supporting the call, the QoS resources on this bearer are upgraded at 1065 (e.g., to the full QoS level or an intermediate QoS level that exceeds the initially allocated QoS level from 1035 or 1045), after which the App* client application on the given UE continues the call using the upgraded QoS resources, 1070.

As will be appreciated, FIG. 10 is similar in certain respects to FIGS. 6A and 6B. In particular, 1000 through 1015 are somewhat similar to 600B through 615B of FIG. 6B, and 1020 through 1070 are somewhat similar to 600A through 600A through 635A.

Figure 11:
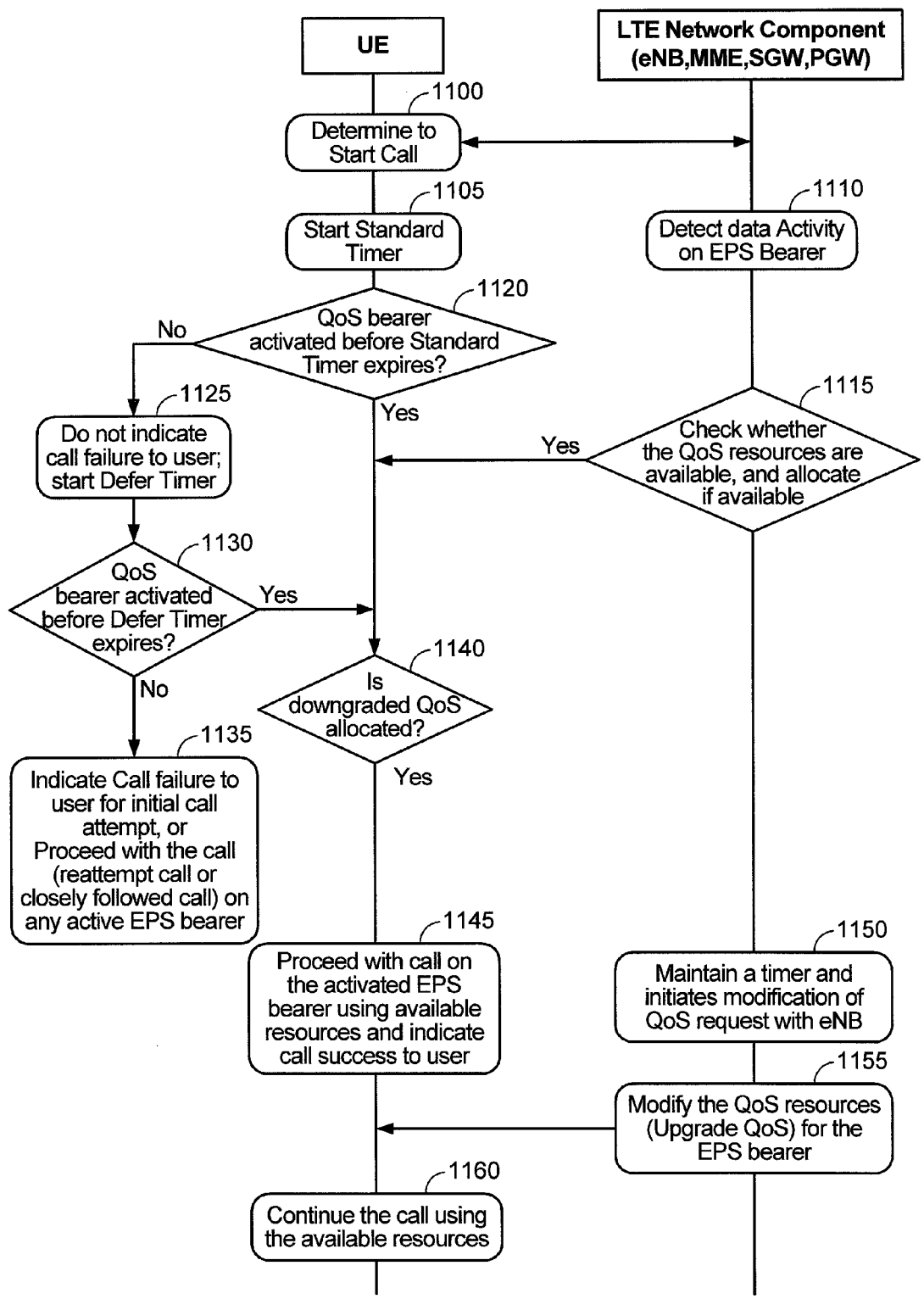
FIG. 11 illustrates a deferred call failure QoS resource acquisition process in an LTE network operating in accordance with network (NW) initiated QoS in accordance with an embodiment of the invention.

FIG. 11 illustrates a deferred call failure QoS resource acquisition process in an LTE network in accordance with an embodiment of the invention. Similar to FIG. 10, FIG. 11 illustrates interactions between a given UE and an LTE network component. FIG. 11 is described with respect to network (NW) initiated QoS which is supported in the LTE network. In other words, the given UE in FIG. 11 is not shown as an entity capable of controlling its QoS allocation (at least, not directly). For example, in FIG. 10, the App* client application on the given UE runs its own QoS monitor timer because the App* client application on the given UE has the ability to modify the QoS at 1055, but in FIG. 11 the App* client application on the given UE does not run such a timer because of the assumption that FIG. 11's operating environment does not permit the given UE to change its QoS allocation. However, it should be noted that the deferred call failure QoS resource acquisition process shown in FIG. 11 can be applied to scenarios where UE initiated QoS is supported in the LTE network (e.g., the given UE can modify its QoS allocation via signaling with the LTE network components), with the QoS activation and modification logic maintained by the UE rather than the application server 170. The LTE network component can correspond to eNodeB 205D at the LTE RAN 120, or to one of the MME 215D, the S-GW 230D and the P-GW 235D of the LTE core network 140 of FIG. 2D.

Referring to FIG. 11, the App* client application on the given UE determines to start an App* call, 1100, and starts a standard timer, 1105. The LTE network component (e.g., the PCRF 240D, the P-GW 235D or alternatively a non-LTE component such as the application server 170) detects data activity on the App* EPS bearer for the given UE and determines to activate or modify the QoS resources on the App* EPS bearer (e.g., to assign more GBR, etc.), 1110. The LTE network component (e.g., the eNodeB 205D, the S-GW 230D and/or the P-GW 235D determines whether the additional QoS resources (e.g., QCI '1' or $QCI_{App*}$) are available for allocation to the EPS bearer for the given UE, and if so, the QoS EPS bearer is allocated to the given UE with the additional QoS resources, 1115.

Meanwhile, the App* client application on the given UE monitors the timer from 1105 and determines whether the timer has expired, 1120. If the timer is determined to expire before the QoS is allocated at 1115, the App* client application on the given UE does not indicate call failure to its user, and instead starts a defer timer, 1125 (e.g., similar to 715A of FIG. 7A). The App* client application on the given UE monitors the defer timer from 1125 and determines whether the defer timer has also expired, 1130. If so, the given UE can either proceed with the App* call without QoS on a non-GBR EPS bearer (e.g., best effort scenario, similar to FIG. 10), or alternatively can fail the call, 1135. If QoS is allocated to the given UE before the timer and defer timer both expire, the App* client application on the given UE determine whether the allocated QoS corresponds to the requested QoS level (e.g., QCI '1' or $QCI_{App*}$) or a reduced QoS level, 1140. While not shown in FIG. 11, if the requested QoS level is allocated, the App* client application on the given UE simply proceeds with the call. If the reduced QoS level is determined to be allocated at 1140, the App* client application on the given UE proceeds with the call using the allocated resources and indicates call success to its user, 1145 (e.g., the user thinks the given UE was allocated full QoS instead of reduced QoS).

During the call, the LTE network component (e.g., the P-GW 235D) or the application server 170 can maintain a QoS monitor timer for the given UE in response to the less than requested QoS being allocated to its EPS bearer supporting the call (i.e., the reduced QoS or no QoS), 1150. When this timer expires, the LTE network component can initiate a GBR EPS bearer to be setup with the given UE's initially requested QoS (e.g., QCI '1' or $QCI_{App*}$), as shown in 1155 where the QoS resources on this bearer are upgraded at 1155 (e.g., to the full QoS level or an intermediate QoS level that exceeds the initially allocated QoS level from 1115 or 1135), after which the given UE continues the call using the upgraded QoS resources, 1160. While not shown explicitly in FIG. 11, the given UE could also monitor its own timer to trigger a QoS resource upgrade on its EPS bearer, as shown in FIG. 10 at 1055, if UE initiated QoS is supported in the LTE network.

Figure 12:
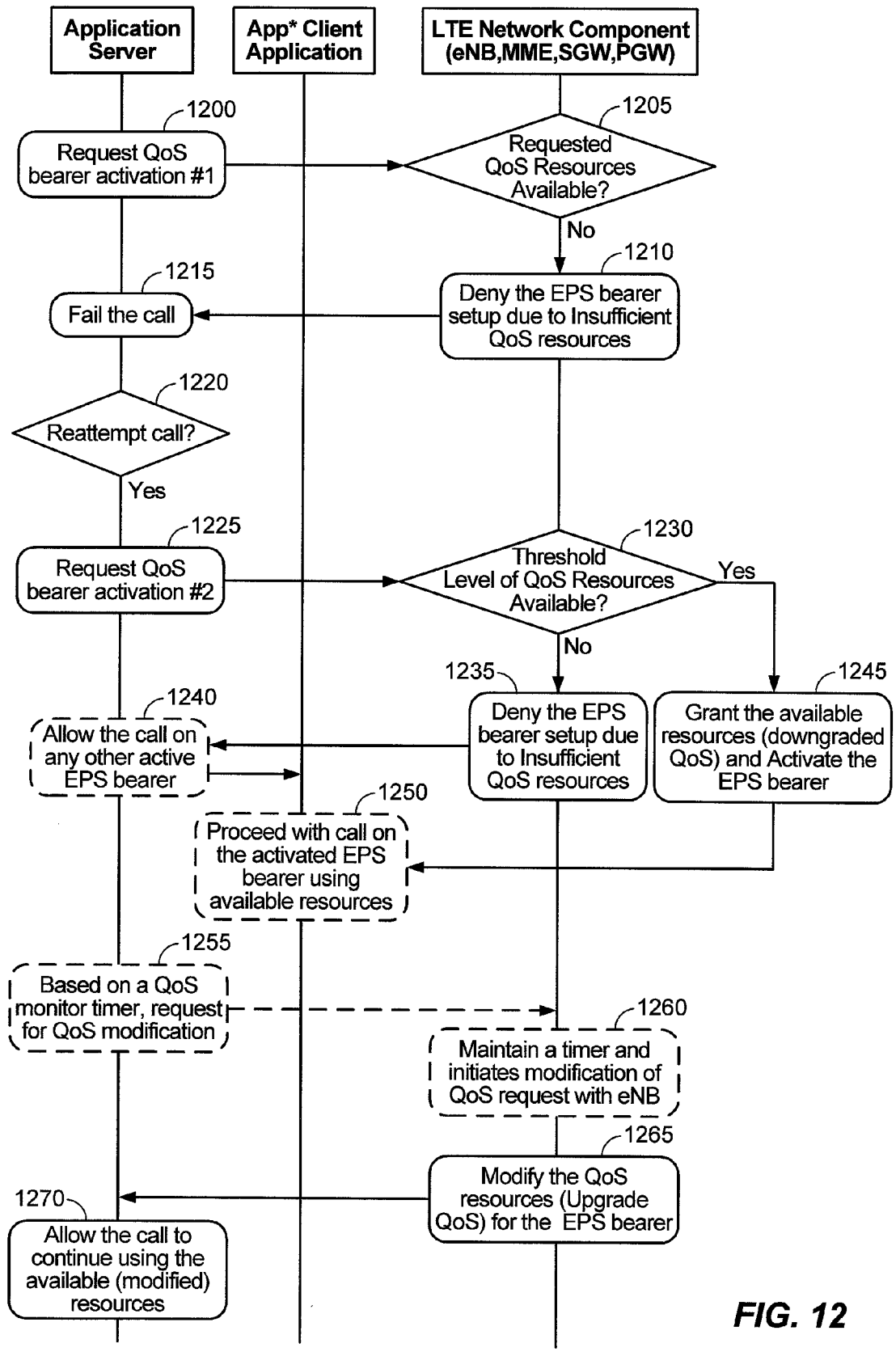
FIG. 12 illustrates another "best effort" QoS resource acquisition process in an LTE network operating in accordance with NW initiated QoS in accordance with an embodiment of the invention.

FIG. 12 illustrates another "best effort" QoS resource acquisition process in an LTE network in accordance with an embodiment of the invention. FIG. 12 is similar to FIG. 10, except that FIG. 12 further shows interactions involving the application server 170, whereas FIG. 10 shows interactions between the given UE and the LTE network component. FIG. 12 thereby demonstrates that the operations performed by the given UE in FIG. 10 can be carried over to the application server 170, so that the application server 170 can be responsible for initiating a best effort QoS communication session with the given UE. In FIG. 12, NW initiated QoS is supported in the LTE network, and the application server 170 can also control the App* call based on the QoS allocated for the users in the App* call. For NW initiated QoS, the given UE itself cannot request QoS modifications, but the application server 170 can request QoS modifications on behalf of the given UE, as shown in FIG. 12 at 1255 (similar to 1055 of FIG. 10). Because the operation of FIG. 12 is substantially the same as FIG. 10 except for the entities performing the operations being different (e.g., UE or server), a further description of FIG. 12 has been omitted for the sake of brevity.

Figure 13:
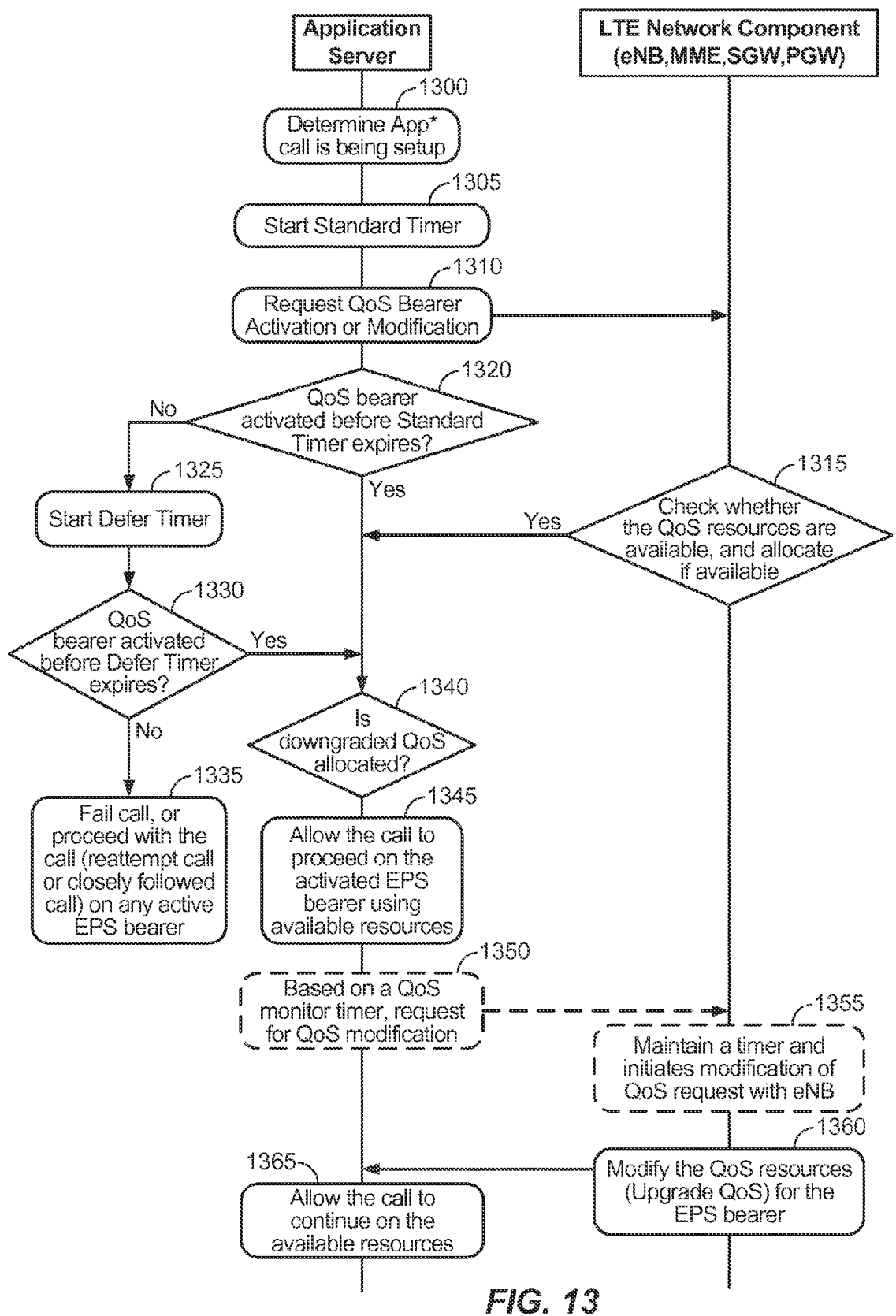
FIG. 13 illustrates another deferred call failure QoS resource acquisition process in an LTE network operating in accordance with NW initiated QoS in accordance with an embodiment of the invention.

FIG. 13 illustrates another deferred call failure QoS resource acquisition process in an LTE network in accordance with an embodiment of the invention. Portions of FIG. 13 are similar to FIG. 11, except that FIG. 13 shows interactions between the application server 170 and an LTE network component. In FIG. 13, NW initiated QoS is supported in the LTE network, and the application server 170 can control the App* call based on the QoS allocated for the users in the App* call, whereas FIG. 10 shows interactions between the given UE and the LTE network component. For NW initiated QoS, the given UE itself cannot request QoS modifications, but the application server 170 can request QoS modifications on behalf of the given UE, as shown in FIG. 13 at 1350 (similar to 1055 of FIG. 10). Thus, FIG. 13 shows 1350 to demonstrate that the application server 170 can control QoS allocations in a NW initiated QoS operating environment, which is not possible for the given UE. Except for 1350, the other blocks are similar to FIG. 11 except for the execution entity (e.g., application server 170 instead of UE) as noted above. FIG. 13 thereby demonstrates that certain the operations performed by the given UE in FIG. 11 can be carried over to the application server 170, so that the application server 170 can be responsible for initiating deferred call failure QoS session establishment.

Referring to FIG. 13, the application server 170 determines that an App* call is being setup between two or more UEs (with at least one of the UEs served by the LTE network), 1300, and starts a standard timer, 1305. The application server 170 then requests that QoS be setup by the LTE network component for the App* call on a GBR EPS bearer, 1310, for each UE involved in the call. At this point, except for the entities performing some of the illustrated operations being different (e.g., UE or server), 1315 through 1345 and 1355 through 1365 of FIG. 13 substantially correspond to 1115 through 1160 of FIG. 11, respectively. Accordingly, a further description of FIG. 13 has been omitted for the sake of brevity. However, it is noted that certain user interface (UI) operations, such as notifying the user of the given UE of call success or call failure at 1135 and 1145 of FIG. 11, can be omitted in corresponding 1335 and 1345 of FIG. 13 because the application server 170 does not perform UI operations for the given UE's user.

As noted above, FIG. 10 is directed to a UE-side "best effort" solution where call control resides at the given UE in a UE initiated QoS operating environment, FIG. 11 is directed to a UE-side "deferred call failure" solution where call control resides at the given UE in a NW initiated QoS operating environment, FIG. 12 is directed to a NW-side call failure before "best effort" solution where call control resides at the application server 170 in a NW initiated QoS operating environment, and FIG. 13 is directed to a NW-side "deferred call failure" solution where call control resides at the application server 170 in a NW initiated QoS operating environment. However, in the NW initiated QoS operating environment, it is possible to permit the given UE to maintain call control logic even though the given UE does not control QoS, such that the application server 170 can independently perform QoS control functions on behalf of the given UE. With this in mind, FIGS. 14-15 are similar to FIGS. 12-13, except that FIG. 14 is directed to a UE-side call failure before "best effort" QoS resource acquisition process where call control resides at the given UE but the application server 170 retains QoS control in a NW initiated QoS operating environment in accordance with an embodiment of the invention, and FIG. 15 is directed to a UE-side deferred call failure QoS resource acquisition process where call control resides at the given UE but the application server 170 retains QoS control in a NW initiated QoS operating environment in accordance with another embodiment of the invention.

Figure 14:
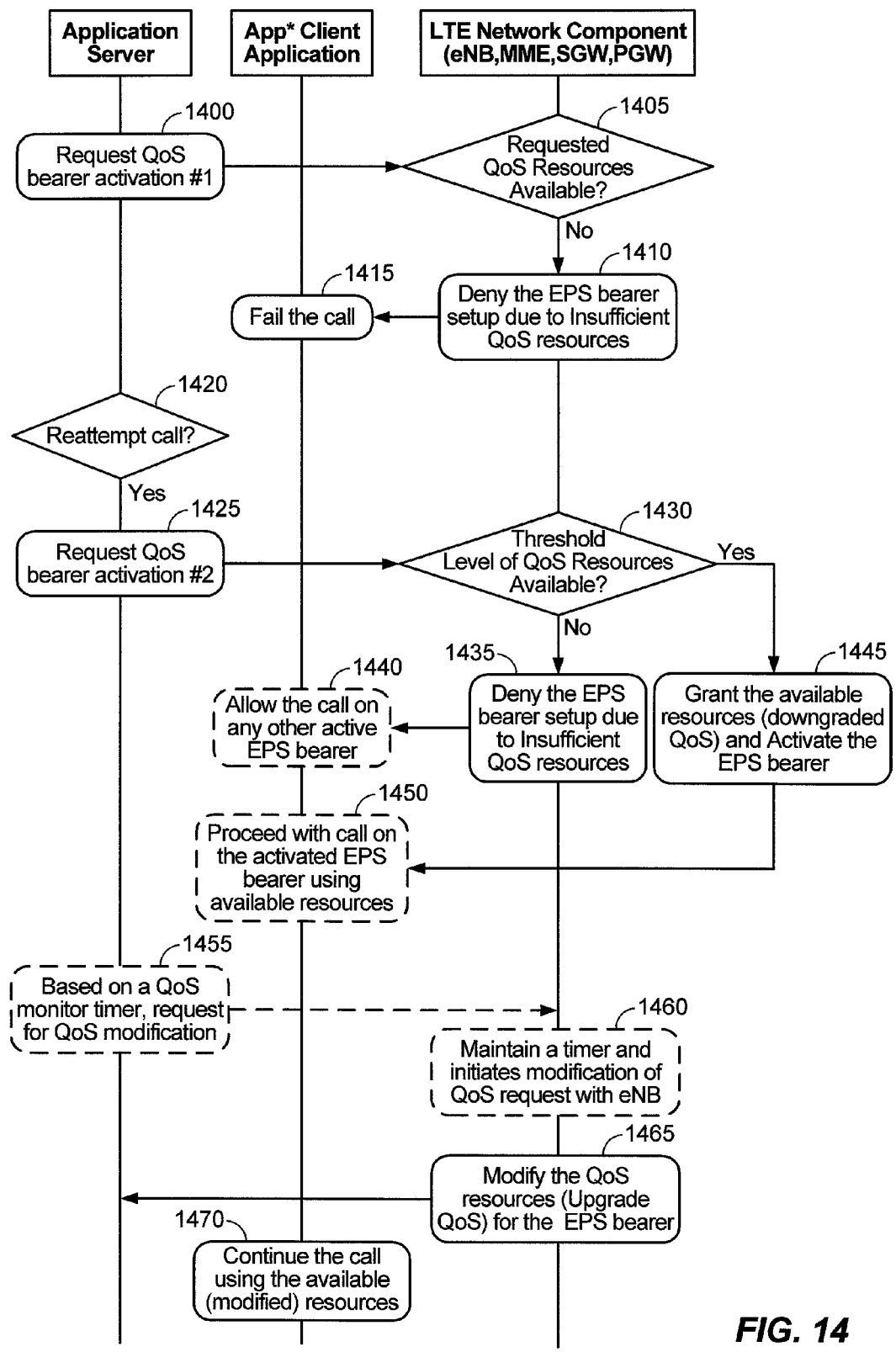
FIG. 14 is directed to a UE-side call failure before "best effort" QoS resource acquisition process where call control resides at the UE but the application server retains QoS control in a NW initiated QoS operating environment in accordance with an embodiment of the invention.
Figure 15:
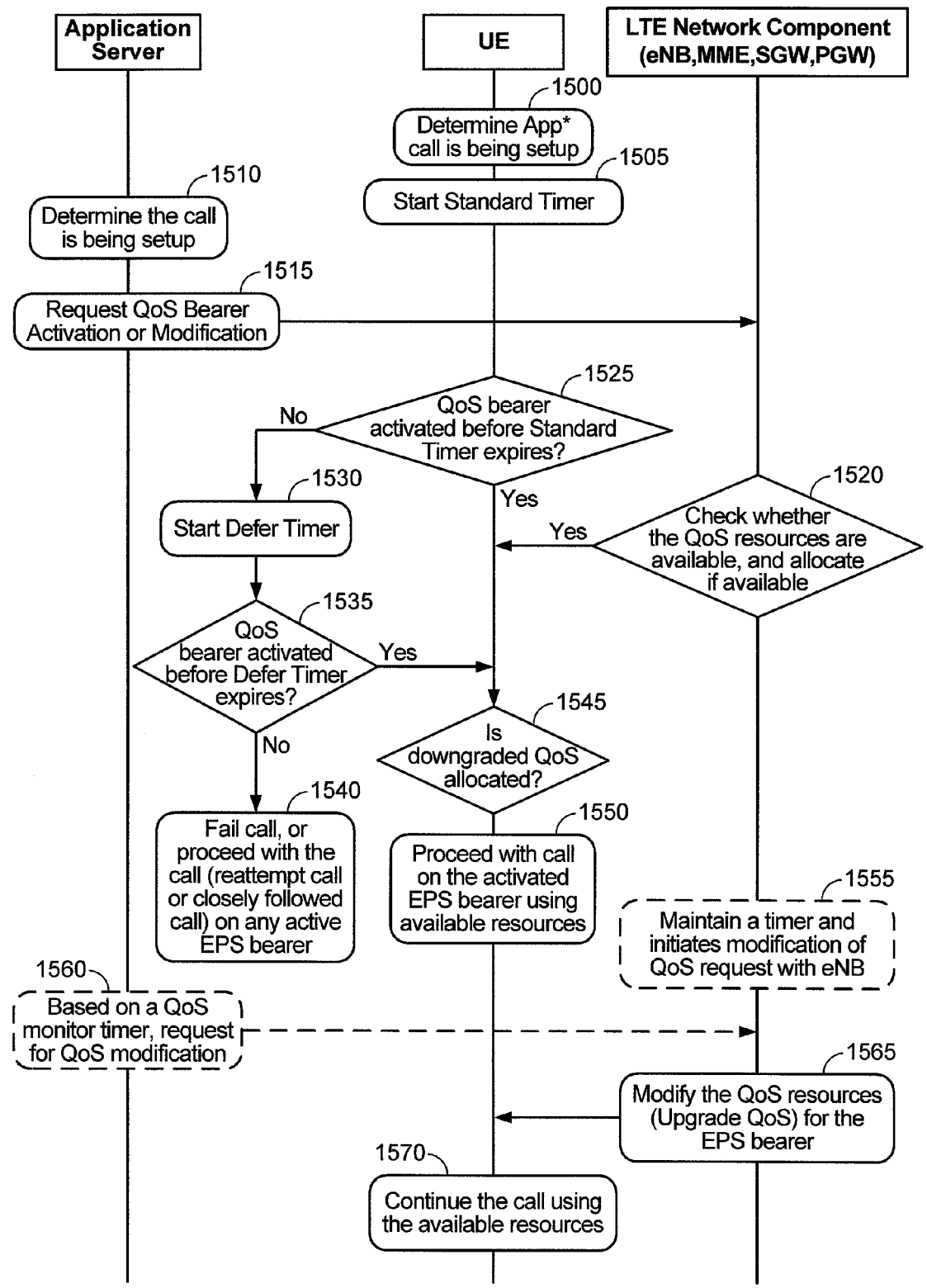
FIG. 15 is directed to a UE-side deferred call failure QoS resource acquisition process where call control resides at the UE but the application server retains QoS control in a NW initiated QoS operating environment in accordance with another embodiment of the invention.

Referring to FIG. 14, the application server 170 transmits a request for activation of a GBR EPS bearer, such as a media bearer for a call being setup for App*, to the MME 215D, 1400. Upon receiving the activation request for the GBR EPS bearer at 1400, the LTE network components (eNB, S-GW, P-GW) determine whether sufficient QoS resources are available for allocation to the given UE, 1405. While not shown expressly in FIG. 14, if sufficient QoS resources are determined to be available for supporting the GBR EPS bearer in 1405, the GBR EPS bearer is simply activated as requested. In this example, assume that sufficient QoS resources are determined not to be available for activating the GBR EPS bearer in 1405. Accordingly, the GBR EPS bearer setup is denied due to insufficient QoS resources, 1410, and the App* client application on the given UE fails the call, 1415.

After the application server 170 determines that the call has failed at the App* client application, the application server 170 determines whether to re-attempt the call, 1420. In an example, the application server 170 can automatically determine to re-attempt the call after an initial call failure at 1420. If the application server 170 determines to re-attempt the call at 1420, the App application server 170 transmits another request for activation of the GBR EPS bearer, such as a media bearer for a call being setup for App*, to MME 215D, 1425. Upon receiving the activation request for the GBR EPS bearer at 1425, the LTE network components (eNB, S-GW, P-GW) again determine whether a reduced level of QoS resources are available for allocation to the given UE, 1430. For example, the determination of 1405 can determine whether QCI '1' or $QCI_{App*}$ is available for reservation to the given UE, whereas the determination of 1430 can determine whether some lesser QoS level is available for reservation to the given UE. If even the reduced level of QoS resources is determined to be unavailable at 1430, the LTE network component denies setup of the GBR EPS bearer due to insufficient QoS resources, 1435. However, instead of simply failing the call again, the client application for App* permits the call to be setup using any active EPS bearer (without GBR QoS), 1440.

Alternatively, if the reduced level of QoS resources is determined to be available at 1430, the LTE network component grants the GBR EPS bearer with the reduced level of QoS resources, 1445, and the client application for App* permits the call to be setup using the activated GBR EPS bearer (with the reduced QoS), 1450.

During the call, because FIG. 14 relates to a NW initiated QoS operating environment, the application server 170 (instead of the given UE as in FIG. 10) starts a QoS monitor timer to monitor the level of QoS allocated to its EPS bearer supporting the App* call (i.e., the reduced QoS or no QoS), 1455. When this timer expires, the application server 170 can transmit a request to have a GBR EPS bearer setup with its initially requested QoS (e.g., QCI '1' or $QCI_{App*}$). Alternatively (or in addition), the LTE network component (e.g., the P-GW 235D) can also maintain a QoS monitor timer for the given UE in response to the less than requested QoS being allocated to its EPS bearer supporting the call (i.e., the reduced QoS or no QoS), 1460. When this timer expires, the LTE network component can initiate a GBR EPS bearer to be setup with the given UE's initially requested QoS (e.g., QCI '1' or $QCI_{App*}$). Irrespective of whether the application server 170 timer's expiration or the LTE network component's timer's expiration triggers the QoS modification to the EPS bearer supporting the call, the QoS resources on this bearer are upgraded at 1465 (e.g., to the full QoS level or an intermediate QoS level that exceeds the initially allocated QoS level from 1435 or 1445), after which the App* client application on the given UE continues the call using the upgraded QoS resources, 1470.

Referring to FIG. 15, the App* client application on the given UE determines that an App* call is being setup between two or more UEs (with at least one of the UEs served by the LTE network), 1500, and starts a standard timer, 1505. The application server 170 also determines that an App* call is being setup between two or more UEs (with at least one of the UEs served by the LTE network), 1510, and the application server 170 then requests that QoS be setup by the LTE network component for the App* call on a GBR EPS bearer, 1515, for each UE involved in the call. Thus, the App* client application is monitoring the QoS settings for the App* call based on the timer, but the application server 170 is the entity actually requested the QoS resources to be setup for the App* call. This is contrasted with the UE initiated QoS example of FIG. 11 where the App* client application both requests the QoS setup and also monitors the timer, or the NW initiated QoS example of FIG. 13 where the application server 170 both requests the QoS setup and also monitors the timer. At this point, 1525 through 1550 substantially correspond to 1115 through 1145 of FIG. 11, respectively, and 1555 through 1570 substantially correspond to 1350 through 1365 of FIG. 13, respectively.

While the embodiments above have been described primarily with reference to 1×EV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating an apparatus associated with setting up a communication session for a client device, comprising:
    sending, to a Long Term Evolution (LTE) network component, a request to setup a Quality of Service (QoS) bearer with a threshold level of QoS to support the communication session for the client device; and
    permitting the client device to proceed with an attempt to setup the communication session irrespective of whether the LTE network component grants the threshold level of QoS for the QoS bearer,
    wherein the apparatus corresponds to an application server that is external to an LTE network serving the client device and is configured to arbitrate the communication session.

2. The method of claim 1, further comprising:
    receiving, in response to the request, a message allocating a lower level of QoS than the threshold level of QoS,
    wherein the apparatus attempts to setup the communication session using the lower level of QoS.

3. The method of claim 2, further comprising:
    receiving, during the communication session, a supplemental message that allocates at least the threshold level of QoS requested in the request without the client device sending a supplemental QoS request.

4. The method of claim 3, further comprising:
    transmitting a supplemental request, during the communication session, that the LTE network component allocate additional QoS to the client device if possible,
    wherein the supplemental message is received in response to the supplemental request.

5. The method of claim 1, further comprising:
    transmitting an initial request for an initial threshold level of QoS to the LTE network component, the initial request associated with an initial session setup attempt by the client device to set up the communication session,
    wherein the initial session setup attempt results in session setup failure based on the initial request not being granted by the LTE network component,
    wherein the sending and the permitting are performed in response to a detection of the failure of the initial session setup attempt, and
    wherein the initial session setup attempt corresponds to a second attempt by the apparatus to set up the communication session.

6. The method of claim 5, wherein the sending and the permitting are performed if the sending is initiated relatively soon after the detection of the failure of the initial session setup attempt.

7. The method of claim 1, wherein the threshold level of QoS includes QoS resources on both (i) an air interface between the client device and an access network, and (ii) an interface between components at an LTE core network.

8. The method of claim 7,
    wherein the interface is an S5 interface, and
    wherein the components are a Serving Gateway (S-GW) and a Packet Data Network Gateway (P-GW) of the LTE core network.

9. An apparatus associated with setting up a communication session for a client device, comprising:
    means for sending, to a Long Term Evolution (LTE) network component, a request to setup a Quality of Service (QoS) bearer with a threshold level of QoS to support the communication session for the client device; and
    means for permitting the client device to proceed with an attempt to setup the communication session irrespective of whether the LTE network component grants the threshold level of QoS for the QoS bearer,
    wherein the apparatus corresponds to an application server that is external to an LTE network serving the client device and is configured to arbitrate the communication session, or wherein the apparatus corresponds to the client device.

10. An apparatus associated with setting up a communication session for a client device, comprising:
    a memory; and
    a processor coupled to the memory, the processor and the memory configured to:
    send, to a Long Term Evolution (LTE) network component, a request to setup a Quality of Service (QoS) bearer with a threshold level of QoS to support the communication session for the client device; and
    permit the client device to proceed with an attempt to setup the communication session irrespective of whether the LTE network component grants the threshold level of QoS for the QoS bearer, wherein the apparatus corresponds to an application server that is external to an LTE network serving the client device and is configured to arbitrate the communication session, or wherein the apparatus corresponds to the client device.

11. A non-transitory computer-readable medium containing instructions stored thereon, which, when executed by an apparatus associated with setting up a communication session for a client device, cause the apparatus to perform operations, the instructions comprising:
 at least one instruction configured to cause the apparatus to send, to a Long Term Evolution (LTE) network component, a request to setup a Quality of Service (QoS) bearer with a threshold level of QoS to support the communication session for the client device; and
 at least one instruction configured to cause the apparatus to permit the client device to proceed with an attempt to setup the communication session irrespective of whether the LTE network component grants the threshold level of QoS for the QoS bearer,
wherein the apparatus corresponds to an application server that is external to an LTE network serving the client device and is configured to arbitrate the communication session, or wherein the apparatus corresponds to the client device.

* * * * *